United States Patent
Lee et al.

(10) Patent No.: US 12,518,807 B2
(45) Date of Patent: Jan. 6, 2026

(54) SEMICONDUCTOR APPARATUS AND SEMICONDUCTOR SYSTEM HAVING INDEPENDENT DATA INPUT/OUTPUT PERIOD, AND OPERATING METHOD OF THE SEMICONDUCTOR SYSTEM

(71) Applicant: SK hynix Inc., Icheon-si (KR)

(72) Inventors: Jae Young Lee, Icheon-si (KR); Won Sun Park, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 278 days.

(21) Appl. No.: 18/297,307

(22) Filed: Apr. 7, 2023

(65) Prior Publication Data

US 2023/0326495 A1    Oct. 12, 2023

Related U.S. Application Data

(60) Provisional application No. 63/328,558, filed on Apr. 7, 2022.

(30) Foreign Application Priority Data

Mar. 24, 2023  (KR) .................... 10-2023-0038600

(51) Int. Cl.
*G11C 7/10* (2006.01)
*G11C 7/20* (2006.01)

(52) U.S. Cl.
CPC .......... *G11C 7/1039* (2013.01); *G11C 7/1063* (2013.01); *G11C 7/20* (2013.01)

(58) Field of Classification Search
CPC .................................................. G11C 7/1039
See application file for complete search history.

(56) References Cited

U.S. PATENT DOCUMENTS

| 7,296,124 | B1 | 11/2007 | Falik |
| 8,732,433 | B2 | 5/2014 | Chen et al. |
| 2008/0082730 | A1* | 4/2008 | Kim .................... G06F 11/1068 711/E12.008 |
| 2011/0072200 | A1* | 3/2011 | Lee ........................ G11C 16/10 365/185.23 |
| 2022/0398043 | A1 | 12/2022 | Yasuda |
| 2023/0352083 | A1 | 11/2023 | Sasaki et al. |

FOREIGN PATENT DOCUMENTS

KR    101093620 B1    12/2011

* cited by examiner

*Primary Examiner* — Douglas King
(74) *Attorney, Agent, or Firm* — WILLIAM PARK AND ASSOCIATES LTD.

(57) ABSTRACT

A semiconductor system includes a first semiconductor apparatus and a second semiconductor apparatus. The first semiconductor apparatus provides the second semiconductor apparatus with a chip enable signal and a command address signal set, and the second semiconductor apparatus performs an internal operation based on the chip enable signal and the command address signal set. The first semiconductor apparatus provides the second semiconductor apparatus with a selection chip enable command, and the second semiconductor apparatus transmits data to the first semiconductor apparatus or receives the data from the first memory device after receiving the selection chip enable command.

7 Claims, 11 Drawing Sheets

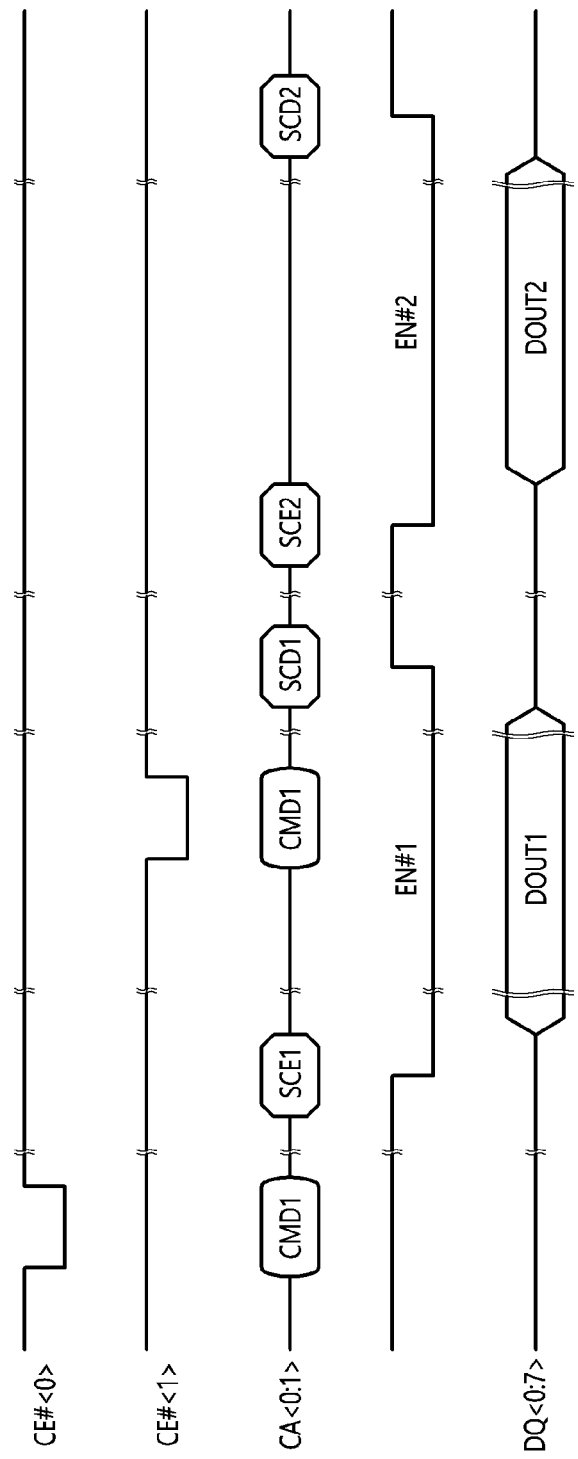

FIG. 7

| FIRST HEADER | | SECOND HEADER | | DEFINITION |
|---|---|---|---|---|
| CA<0> | CA<1> | CA<0> | CA<1> | |
| 0 | 0 | 0 | 0 | Data Output |
| 0 | 0 | 0 | 1 | Data Input |
| 1 | 0 | 0 | 0 | Address Input |
| 0 | 1 | 0 | 0 | Command Input |
| 1 | 1 | 1 | 0 | SCE |
| 1 | 1 | 0 | 1 | SCD |
| 1 | 1 | 1 | 1 | SCT |
| 1 | 1 | 0 | 0 | LUN Selection |

| | FIRST BODY | SECOND BODY | THIRD BODY | FOURTH BODY |
|---|---|---|---|---|
| CA<0> | S0 | S2 | S4 | S6 |
| CA<1> | S1 | S3 | S5 | S7 |

SEMICONDUCTOR APPARATUS AND SEMICONDUCTOR SYSTEM HAVING INDEPENDENT DATA INPUT/OUTPUT PERIOD, AND OPERATING METHOD OF THE SEMICONDUCTOR SYSTEM

CROSS-REFERENCES TO RELATED APPLICATIONS

The present application claims the benefit under 35 U.S.C. § 119(e) of U.S. Provisional application No. 63/328,558, filed on Apr. 7, 2022, and claims priority to Korean application number 10-2023-0038600, filed on Mar. 24, 2023, in the Korean Intellectual Property Office, which are incorporated herein by reference in their entirety.

BACKGROUND

1. Technical Field

The present technology relates to an integrated circuit technology, and more particularly, to a semiconductor apparatus and semiconductor system having a data input/output period.

2. Related Art

Electronic devices may include many electronic components. Among the electronic devices, a computer system may include many semiconductor apparatuses made of a semiconductor. The semiconductor apparatuses that constitute the computer system may include a processor or memory controller operating as a master device and a memory device or storage device operating as a slave device. The master device may provide the slave device with a command address signal, and the slave device may perform various operations based on the command address signal. In addition, the master device and the slave device may transmit and receive data to and from each other.

In a NAND flash memory system, a NAND flash memory device may communicate with a memory controller through various interface methods. In a NAND interface method, a command address signal and data may be transmitted through the same input/output bus. As an operating frequency of the NAND flash memory system increases, command overhead increases in the NAND interface method, which may cause performance degradation of the memory system. In a separate command address (SCA) interface method, a command address signal and data may be transmitted through different input/output buses. Although the command overhead may partially decrease in the SCA interface method, it is difficult to perform operations of a plurality of NAND flash memory devices in parallel.

SUMMARY

A semiconductor apparatus according to an embodiment may include a memory cell array, a control circuit, a page buffer group and a data input and output (input/output) circuit. The control circuit may be configured to generate a buffer control signal based on a chip enable signal and a first command address signal set, and to generate a data enable signal based on a second command address signal set. The page buffer group may be configured to, based on the buffer control signal, generate internal data by reading data stored in the memory cell array or reset latch values of latch circuits. The data input and output circuit is connected to a data bus based on the data enable signal, and is configured to transmit data to the data bus or receive the data transmitted through the data bus, based on the internal data.

A semiconductor system according to an embodiment may include a first semiconductor apparatus and a second semiconductor apparatus. The first semiconductor apparatus may be configured to provide a chip enable signal, a command address signal set, and a selection chip enable command. The second semiconductor apparatus may be configured to perform an internal operation based on the chip enable signal and the command address signal set, and to transmit data to the first semiconductor apparatus or receive the data from the first semiconductor apparatus after receiving the selection chip enable command.

A semiconductor system according to an embodiment may include a semiconductor apparatus, a first memory die, and a second memory die. The semiconductor apparatus may be configured to provide a first chip enable signal, a second chip enable signal, a command address signal set, and a first selection chip enable command. The first memory die may be configured to perform an internal operation based on the first chip enable signal and the command address signal set, and to transmit data to the semiconductor apparatus or receive the data from the semiconductor apparatus after receiving the first selection chip enable command. The second memory die may be configured to perform an internal operation based on the second chip enable signal and the command address signal set.

BRIEF DESCRIPTION OF THE DRAWINGS

FIG. 3A is a diagram illustrating an operation of a semiconductor system according to an embodiment of the present technology.

FIG. 7 is a table illustrating a command address signal set according to an embodiment of the present technology.

DETAILED DESCRIPTION

Hereinafter, embodiments of the present technology will be described in more detail with reference to the accompanying drawings.

Figure 1:
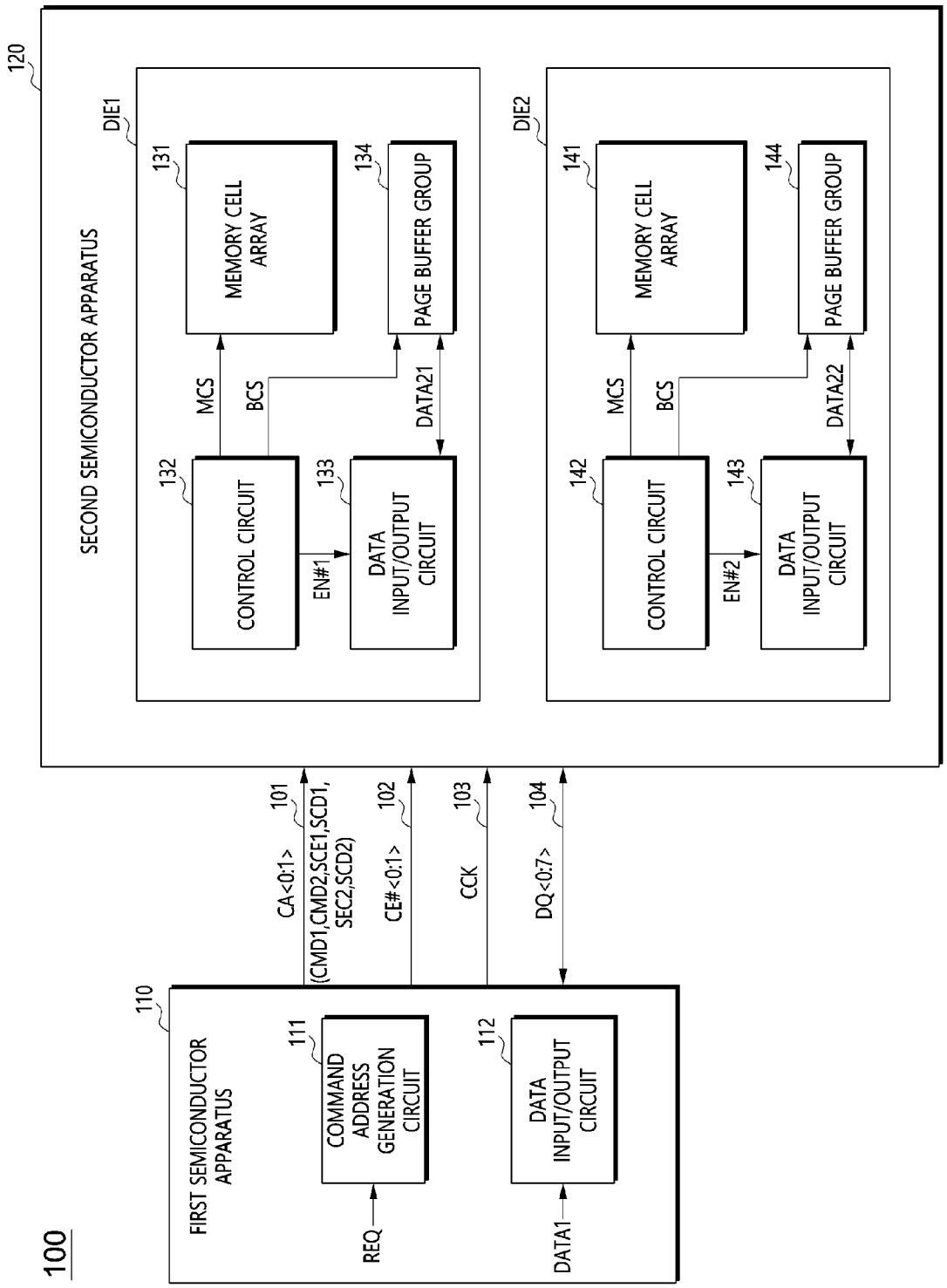
FIG. 1 is a diagram illustrating a construction of a semiconductor system according to an embodiment of the present technology.

FIG. 1 is a diagram illustrating a construction of a semiconductor system 100 according to an embodiment of the present technology. In FIG. 1, the semiconductor system 100 may include a first semiconductor apparatus 110 and a second semiconductor apparatus 120. The first semiconductor apparatus 110 may provide various control signals that are necessary for the second semiconductor apparatus 120 to operate. The first semiconductor apparatus 110 may include various types of master devices. For example, the first semiconductor apparatus 110 may be a host device, such as a central processing unit (CPU), a graphic processing unit (GPU), a multi-media processor (MMP), a digital signal processor, an application processor (AP), and a memory controller. The second semiconductor apparatus 120 may be a slave device, for example, a memory device, that performs various operations under the control of the first semiconductor apparatus 110. The memory device may include volatile memory and nonvolatile memory. The volatile memory may include static RAM (SRAM), dynamic RAM (DRAM), and synchronous DRAM (SDRAM). The nonvolatile memory may include read-only memory (ROM), programmable ROM (PROM), electrically erasable PROM (EEPROM), electrically programmable ROM (EPROM), flash memory, phase change RAM (PRAM), magnetic RAM (MRAM), resistive RAM (RRAM), and ferroelectric RAM (FRAM).

semiconductor apparatus 110 may be connected to the second semiconductor apparatus 120 through a plurality of buses. The plurality of buses may each be a signal transmission path, link, or channel for transmitting a signal. The plurality of buses may include a command address bus 101, a chip enable bus 102, a command clock bus 103, and a data bus 104. Each of the command address bus 101, the chip enable bus 102, and the command clock bus 103 may be a unidirectional bus from the first semiconductor apparatus 110 to the second semiconductor apparatus 120, and the data bus 104 may be a bidirectional bus. The first semiconductor apparatus 110 may provide the second semiconductor apparatus 120 with command address signals CA<0:1> through the command address bus 101. The command address signals CA<0:1> transmitted by the first semiconductor apparatus 110 may include a command signal and an address signal. The command signal may include command information specifying an operation performed by the second semiconductor apparatus 120. The address signal ADD may include address information for accessing a storage area of the second semiconductor apparatus 120. For example, the command signal may include a data input command, a data output command, a selection chip enable command, and a selection chip disable command. In one embodiment, the command signal may further include a selection chip termination command. The first semiconductor apparatus 110 may transmit the 2-bit command address signals CA<0:1> to the second semiconductor apparatus 120 for each unit cycle through the command address bus 101. The command address signals CA<0:1> transmitted during a plurality of cycles may constitute one command address signal set. The first semiconductor apparatus 110 may transmit chip enable signals CE#<0:1> to the second semiconductor apparatus 120 through the chip enable bus 102. Although FIG. 1 illustrates that the chip enable signals include 2 bits, the number of bits of the chip enable signal CE#<0:1> may vary depending on the number of memory dies or memory chips included in the second semiconductor apparatus 120. For example, when the second semiconductor apparatus 120 includes two memory dies or memory chips, the first semiconductor apparatus 110 may provide the second semiconductor apparatus 120 with a first chip enable signal CE#<0> and a second chip enable signal CE#<1> through the chip enable bus 102. The first and second chip enable signals CE#<0> and CE#<1> may be provided together with the command address signals CA<0:1>. For example, the first semiconductor apparatus 110 may provide the second semiconductor apparatus 120 with the command address signals CA<0:1> and the first chip enable signal CE#<0> together to operate a first memory die DIE1 of the second semiconductor apparatus 120. The first semiconductor apparatus 110 may transmit the command address signals CA<0:1> and the second chip enable signal CE#<1> together to the second semiconductor apparatus 120 to operate a second memory die DIE2 of the second semiconductor apparatus 120.

The first semiconductor apparatus 110 may provide the second semiconductor apparatus 120 with a command clock signal CCK through the command clock bus 103. The command clock signal CCK may be a signal synchronized with the command address signals CA<0:1>, and a signal defining a period in which the second semiconductor apparatus 120 receives the command address signals CA<0:1> as valid signals. For example, in a period in which the command clock signal CCK toggles, the second semiconductor apparatus 120 may sample the command address signals CA<0:1>, which are transmitted from the first semiconductor apparatus 110, as the valid signals. The first semiconductor apparatus 110 may provide the second semiconductor apparatus 120 with data DQ<0:7> through the data bus 104, or receive the data DQ<0:7> from the second semiconductor apparatus 120. Such an operation of transmitting the data DQ<0:7> from the first semiconductor apparatus 110 to the second semiconductor apparatus 120 may be a data input operation, and such an operation of transmitting the data DQ<0:7> from the second semiconductor apparatus 120 to the first semiconductor apparatus 110 may be a data output operation.

The first semiconductor apparatus 110 may include a command address generation circuit 111 and a data input/output circuit 112. The command address generation circuit 111 may generate the command address signals CA<0:1> and the chip enable signals CE#<0:1> based on a request REQ of a user. The command address generation circuit 111 may transmit the command address signals CA<0:1> to the second semiconductor apparatus 120 through the command address bus 101, and transmit the chip enable signals CE#<0:1> to the second semiconductor apparatus 120 through the chip enable bus 102. The command address generation circuit 111 may transmit the command address signals CA<0:1> to the second semiconductor apparatus 120 during a plurality of cycles, depending on the length and/or total number of bits of the command address signal set. The command address generation circuit 111 may sequentially transmit one of a first command address signal set, a second command address signal set, and a third command address signal set so that the second semiconductor apparatus 120 may perform at least one specific operation. The first command address signal set may include a command capable of specifying types of operation performed by the second semiconductor apparatus 120. The second and third command address signal sets may define a data input/output period of the second semiconductor apparatus 120. The command address generation circuit 111 may transmit the first command address signal set together with the chip enable signals CE#<0:1> to the second semiconductor apparatus 120. The command address generation circuit 111 might not transmit the chip enable signals CE#<0:1> to the second semiconductor apparatus 120 when transmitting the second and third command address signal sets to the second semiconductor apparatus 120. Each of the second and third command address signal sets may include selection information for selecting one of a plurality of memory dies included in the second semiconductor apparatus 120.

The first command address signal set may include at least one of a data output command CMD1 and a data input command CMD2. In one embodiment, the data output command CMD1 may be a random data output command. The random data output command may be a command signal instructing an operation of changing a column address signal after a page read operation of the second semiconductor apparatus 120 is performed, and transmitting data read by the second semiconductor apparatus 120 as the data DQ to the first semiconductor apparatus 110 based on the changed column address signal. The data input command CMD2 may be a random data input command. The random data input command may be a command signal instructing an operation of transmitting the data DQ to be used for a page program operation from the first semiconductor apparatus 110 to the second semiconductor apparatus 120 before the page program operation of the second semiconductor apparatus 120 is performed.

When the second semiconductor apparatus 120 includes the first and second memory dies DIE1 and DIE2, the second command address signal set may include at least a first selection chip enable command SCE1 and a first selection chip disable command SCD1. The third command address signal set may include at least a second selection chip enable command SCE2 and a second selection chip disable command SCD2. The first selection chip enable command SCE1 and the first selection chip disable command SCD1 may define the data input/output period of the first memory die DIE1 and/or a period in which the first memory die DIE1 is connected to the data bus 104. The second selection chip enable command SCE2 and the second selection chip disable command SCD2 may define the data input/output period of the second memory die DIE2 and/or a period in which the second memory die DIE2 is connected to the data bus 104. The data input/output period of the first memory die DIE1 and the data input/output period of the second memory die DIE2 might not overlap, and may be set independently of each other. The command address generation circuit 111 may transmit one of the second and first selection chip enable commands SCE2 and SCE1 after transmitting one of the first and second selection chip disable commands SCD1 and SCD2, to prevent data input/output periods of the first and second memory dies DIE1 and DIE2 from overlapping. In an embodiment, the second command address signal set may further include a first selection chip termination command, and the third command address signal set may further include a second selection chip termination command. The first and second selection chip disable commands SCD1 and SCD2 may be replaced by the first and second selection chip termination commands. The first and second selection chip termination commands are described later.

The data input and output (input/output) circuit 112 may be connected to the data bus 104, and may transmit and receive the data DQ<0:7> to and from the second semiconductor apparatus 120 through the data bus 104. During the data output operation, the data input/output circuit 112 may receive the data DQ<0:7> from the second semiconductor apparatus 120, and generate internal data DATA1. During the data input operation, the data input/output circuit 112 may generate the data DQ<0:7> from the internal data DATA1, and transmit the data DQ<0:7> to the second semiconductor apparatus 120. After the second command address signal set or the third command address signal set is transmitted by the command address generation circuit 111, the data input/output circuit 112 may receive the data DQ<0:7> from the second semiconductor apparatus 120 during the data output operation. After the second command address signal set or the third command address signal set is transmitted by the command address generation circuit 111, the data input/output circuit 112 may transmit the data DQ<0:7> to the second semiconductor apparatus 120 during the data input operation.

The second semiconductor apparatus 120 may include the plurality of memory dies. Each of the plurality of memory dies may perform a data input/output operation independently of the first semiconductor apparatus 110. For example, the second semiconductor apparatus 120 may include at least the first memory die DIE1 and the second memory die DIE2. The first and second memory dies DIE1 and DIE2 may have substantially the same configuration. The first and second memory dies DIE1 and DIE2 may include memory cell arrays 131 and 141, respectively. Each of the memory cell arrays 131 and 141 may include a plurality of planes. Each of the plurality of planes may include a plurality of blocks. One block may refer to a unit that can be erased at one time. Each of the plurality of blocks may include a plurality of pages. Each of the pages may refer to a unit that can be programmed or read at one time. Each of the plurality of blocks may be composed of the plurality of pages and a plurality of strings, and a plurality of memory cells may be connected to intersections of the plurality of pages and the plurality of strings. When a specific page among the plurality of pages and a specific string among the plurality of strings are selected, a memory cell connected between the selected page and the selected string may be accessed. Although not illustrated, the memory cell arrays 131 and 141 may each include a row decoding circuit for selecting a specific page based on a row address signal and a column decoding circuit for selecting a specific string based on a column address signal.

The first memory die DIE1 may include a control circuit 132, a data input/output circuit 133, and a page buffer group 134. The control circuit 132 may be connected to the command address bus 101, the chip enable bus 102, and the command clock bus 103, and receive the command address signals CA<0:1>, the chip enable signals CE#<0:1>, and the command clock signal CCK from the first semiconductor apparatus 110 through the command address bus 101, the chip enable bus 102, and the command clock bus 103. The control circuit 132 may generate a memory cell array control signal MCS and a buffer control signal BCS based on the command address signals CA<0:1>, the chip enable signals CE#<0:1> and the command clock signal CCK. The control circuit 132 may provide the memory cell array 131 with the memory cell control signal MCS, and provide the page buffer group 134 with the buffer control signal BCS. The control circuit 132 may receive the first chip enable signal CE#<0>. The control circuit 132 may generate the memory cell array control signal MCS and the buffer control signal BCS based on the command address signals CA<0:1> received together with the first chip enable signal CE#<0>. For example, the control circuit 132 may generate the memory cell array control signal MCS and the buffer control signal BCS according to the first command address signal set when the first chip enable signal CE#<0> is enabled. The control circuit 132 might not generate the memory cell array control signal MCS and the buffer control signal BCS even though the first command address signal set is inputted when the first chip enable signal CE#<0> is disabled. Although not limited thereto, the memory cell array control signal MCS may include a low voltage, the row address signal, and the column address signal. The low voltage may have various voltage levels depending on types of operation performed by the first memory die DIE1. For example, the low voltage may include a plurality of program voltages, a plurality of verification voltages, a plurality of read voltages, a plurality of erase voltages, or a plurality of pass voltages. The low voltage may be applied to a page selected by the row address signal. The row address signal and the column address signal may be generated based on an address signal included in the command address signals CA<0:1>. The buffer control signal BCS may include a plurality of control signals so that the page buffer group 134 may perform write and read operations on the memory cell array 131.

The control circuit 132 may generate a first data enable signal EN#1 based on the command address signals CA<0:1>. The control circuit 132 may provide the data input/output circuit 133 with the first data enable signal EN#1. When receiving the second command address signal set, the control circuit 132 may enable the first data enable signal EN#1 based on the second command address signal set. An enable period of the first data enable signal EN#1 may be defined based on the second command address signal set. For example, the control circuit 132 may enable the first data enable signal EN#1 based on the first selection chip enable signal SCE1, and disable the first data enable signal EN#1 based on the first selection chip disable command SCD1.

The data input/output circuit 133 may be connected to the data bus 104, and be connected to the first semiconductor apparatus 110 through the data bus 104. When the first memory die DIE1 performs the data output operation based on the data output command CMD1, the data input/output circuit 133 may receive internal data DATA21 of the first memory die DIE1 from the page buffer group 134. The data input/output circuit 133 may generate the data DQ<0:7> based on the internal data DATA21 of the first memory die DIE1, and transmit the data DQ<0:7> to the first semiconductor apparatus 110 through the data bus 104. When the first memory die DIE1 performs the data input operation based on the data input command CMD2, the data input/output circuit 133 may receive the data DQ<0:7> from the first semiconductor apparatus 110 through the data bus 104, and generate the internal data DATA21 of the first memory die DIE1 based on the data DQ<0:7>. The data input/output circuit 133 may provide the page buffer group 134 with the internal data DATA21 of the first memory die DIE1. The data input/output circuit 133 may include a serializer-deserializer SERDES that serializes the internal data DATA21 of the first memory die DIE1 to generate the data DQ<0:7> or parallelizes the data DQ<0:7> to generate the internal data DATA21. The data input/output circuit 133 may receive the first data enable signal EN#1 from the control circuit 132. The data input/output circuit 133 may be selectively connected to the data bus 104 based on the first data enable signal EN#1. For example, when the first data enable signal EN#1 is enabled, the data input/output circuit 133 may be connected to the data bus 104, and when the first data enable signal EN#1 is disabled, the data input/output circuit 133 may be disconnected from the data bus 104.

The page buffer group 134 may receive the buffer control signal BCS from the control circuit 132, and be connected to a string selected by the column address signal. The page buffer group 134 may include the same number of page buffers as the plurality of strings included in the memory cell array 131, and a plurality of page buffers may be connected to the plurality of strings in a one-to-one manner. The page buffer group 134 may set up voltage levels of the plurality of strings based on the buffer control signal BCS. The page buffer group 134 may read data stored in the memory cell array 131 based on the buffer control signal BCS, and generate the internal data DATA21 of the first memory die DIE1 from the read data. The page buffer group 134 may write and/or program the internal data DATA21 of the first memory die DIE1 to the memory cell array 131 based on the buffer control signal BCS.

When the first memory die DIE1 performs the data output operation based on the data output command CMD1, the page buffer group 134 may read the data stored in the memory cell array 131 based on the buffer control signal BCS, and output the read data as the internal data DATA21 of the first memory die DIE1. The control circuit 132 may serialize the internal data DATA21, and generate the data DQ<0:7>. When the first data enable signal EN#1 is enabled, the data input/output circuit 133 may transmit the data DQ<0:7> to the first semiconductor apparatus 110 through the data bus 104. When the first memory die DIE1 performs the data input operation based on the data input command CMD2, the page buffer group 134 may reset latch values of latch circuits included in the plurality of page buffers, based on the buffer control signal BCS. When the first data enable signal EN#1 is enabled, the data input/output circuit 133 may receive the data DQ<0:7> from the first semiconductor apparatus 110 through the data bus 104, and generate the internal data DATA21 by parallelizing the data DQ<0:7>. The page buffer group 134 may set a latch value corresponding to the internal data DATA21.

The second memory die DIE2 may include a control circuit 142, a data input/output circuit 143, and a page buffer group 144. The control circuit 142, the data input/output circuit 143, and the page buffer group 144 may have substantially the same configuration as the control circuit 132, the data input/output circuit 133, and the page buffer group 134 of the first memory die DIE1, and perform substantially the same functions. Redundant descriptions of substantially the same functions performed by substantially the same components are omitted. The control circuit 142 may receive the second chip enable signal CE#<1>. The control circuit 142 may generate the memory cell array control signal MCS and the buffer control signal BCS based on the command address signals CA<0:1> received together with the second chip enable signal CE#<1>. For example, the control circuit 142 may generate the memory cell array control signal MCS and the buffer control signal BCS according to the first command address signal set when the second chip enable signal CE#<1> is enabled. The control circuit 142 might not generate the memory cell array control signal MCS and the buffer control signal BCS even though the first command address signal set is inputted when the second chip enable signal CE#<1> is disabled.

The control circuit 142 may generate a second data enable signal EN#2 based on the command address signals CA<0:1>. The control circuit 142 may provide the data input/output circuit 143 with the second data enable signal EN#2. When receiving the third command address signal set, the control circuit 142 may enable the second data enable signal EN#2 based on the third command address signal set. An enable period of the second data enable signal EN#2 may be defined based on the third command address signal set. For example, the control circuit 142 may enable the second data enable signal EN#2 based on the second selection chip enable signal SCE2, and disable the second data enable signal EN#2 based on the second selection chip disable command SCD2.

The data input/output circuit 143 may be connected to the data bus 104, and be connected to the first semiconductor apparatus 110 through the data bus 104. When the second memory die DIE2 performs the data output operation based on the data output command CMD1, the data input/output circuit 143 may receive internal data DATA22 of the second memory die DIE2 from the page buffer group 144. The data input/output circuit 143 may generate the data DQ<0:7> based on the internal data DATA22, and transmit the data DQ<0:7> to the first semiconductor apparatus 110 through the data bus 104. When the second memory die DIE2 performs the data input operation based on the data input command CMD2, the data input/output circuit 143 may receive the data DQ<0:7> from the first semiconductor apparatus 110 through the data bus 104, and generate the internal data DATA22 based on the data DQ<0:7>. The data input/output circuit 143 may provide the page buffer group 144 with the internal data DATA22. The data input/output circuit 143 may include a serializer-deserializer SERDES that serializes the internal data DATA22 to generate the data DQ<0:7> or parallelizes the data DQ<0:7> to generate the internal data DATA22. The data input/output circuit 143 may receive the second data enable signal EN#2 from the control circuit 142. The data input/output circuit 143 may be selectively connected to the data bus 104 based on the second data enable signal EN#2. For example, when the second data enable signal EN#2 is enabled, the data input/output circuit 143 may be connected to the data bus 104, and when the second data enable signal EN#2 is disabled, the data input/output circuit 143 may be disconnected from the data bus 104.

When the second memory die DIE2 performs the data output operation based on the data output command CMD1, the page buffer group 144 may read data stored in the memory cell array 141, based on the buffer control signal BCS, and output the read data as the internal data DATA22 of the second memory die DIE2. The data input/output circuit 143 may serialize the internal data DATA22, and generate the data DQ<0:7>. When the second data enable signal EN#2 is enabled, the data input/output circuit 143 may transmit the data DQ<0:7> to the first semiconductor apparatus 110 through the data bus 104. When the second memory die DIE2 performs the data input operation based on the data input command CMD1, the page buffer group 144 may reset latch values of latch circuits included in the plurality of page buffers, based on the buffer control signal BCS. When the second data enable signal EN#2 is enabled, the data input/output circuit 143 may receive the data DQ<0:7> from the first semiconductor apparatus 110 through the data bus 104, and generate the internal data DATA22 by serializing the data DQ<0:7>. The page buffer group 144 may set a latch value corresponding to the internal data DATA22.

Figure 2A:
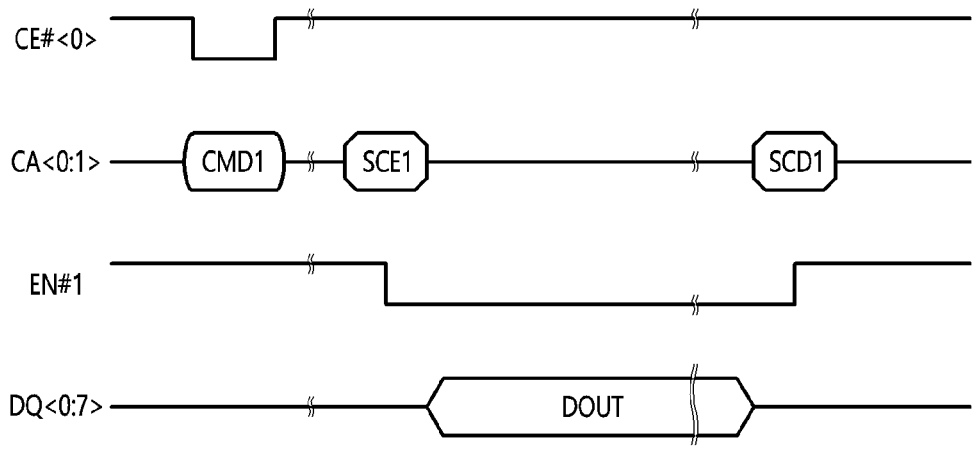
FIG. 2A is a diagram illustrating an operation of a semiconductor system according to an embodiment of the present technology.

FIG. 2A is a diagram illustrating an operation of the semiconductor system 100 according to an embodiment of the present technology. FIG. 2A may illustrate the data output operation performed by the first memory die DIE1 of FIG. 1. Referring to FIGS. 1 and 2A, the first semiconductor apparatus 110 may provide the second semiconductor apparatus 120 with the first chip enable signal CE#<0> and the command address signals CA<0:1> corresponding to the first command address signal set, to instruct the first memory die DIE1 to perform the data output operation. The first command address signal set may include the data output command CMD1. The first memory die DIE1 may receive the data output command CMD1 as a valid command based on the enabled first chip enable signal CE#<0>, and perform an internal operation based on the data output command CMD1. The control circuit 132 of the first memory die DIE1 may generate the memory cell array control signal MCS and the buffer control signal BCS based on the data output command CMD1, and the page buffer group 134 may read data stored in the memory cell array 131, and generate the internal data DATA21 of the first memory die DIE1. The data input/output circuit 133 may serialize the internal data DATA21 of the first memory die DIE1, and generate the data DQ<0:7> and DOUT.

After providing the second semiconductor apparatus 120 with the first chip enable signal CE#<0> and the first command address signal set, the first semiconductor apparatus 110 may provide the second semiconductor apparatus 120 with the command address signals CA<0:1> corresponding the second command address signal set. When providing the second semiconductor apparatus 120 with the second command address signal set, the first semiconductor apparatus 110 might not provide the second semiconductor apparatus 120 with the first chip enable signal CE#<0>. The first semiconductor apparatus 110 may maintain the first chip enable signal CE#<0> in a disabled state. The second command address signal set may include selection information for selecting the first memory die DIE1, and include the first selection chip enable command SCE1 and the first selection chip disable command SCD1. After providing the second semiconductor apparatus 120 with the first chip enable signal CE#<0> and the first command address signal set, the first semiconductor apparatus 110 may provide the second semiconductor apparatus 120 with the first selection chip enable command SCE1. The control circuit 132 may enable the first data enable signal EN#1 based on the first selection chip enable command SCE1. When the first data enable signal EN#1 is enabled, the data input/output circuit 133 may be connected to the data bus 104, and transmit the data DOUT to the first semiconductor apparatus 110 through the data bus 104. The first semiconductor apparatus 110 may provide the second semiconductor apparatus 120 with the first selection chip disable command SCD1 after providing the second semiconductor apparatus 120 with the first selection chip enable command SCE1. In an embodiment, the first semiconductor apparatus 110 may provide the second semiconductor apparatus 120 with the first selection chip disable command SCD1 at the point of time at which the data DOUT is completely transmitted from the second semiconductor apparatus 120. In an embodiment, the first semiconductor apparatus 110 may provide the second semiconductor apparatus 120 with the first selection chip disable command SCD1 when a predetermined time elapses after providing the second semiconductor apparatus 120 with the first selection chip enable command SCE1. The control circuit 132 may disable the first data enable signal EN#1 based on the first selection chip disable command SCD1. When the first data enable signal EN#1 is disabled, the data input/output circuit 133 may be disconnected from the data bus 104.

Figure 2B:
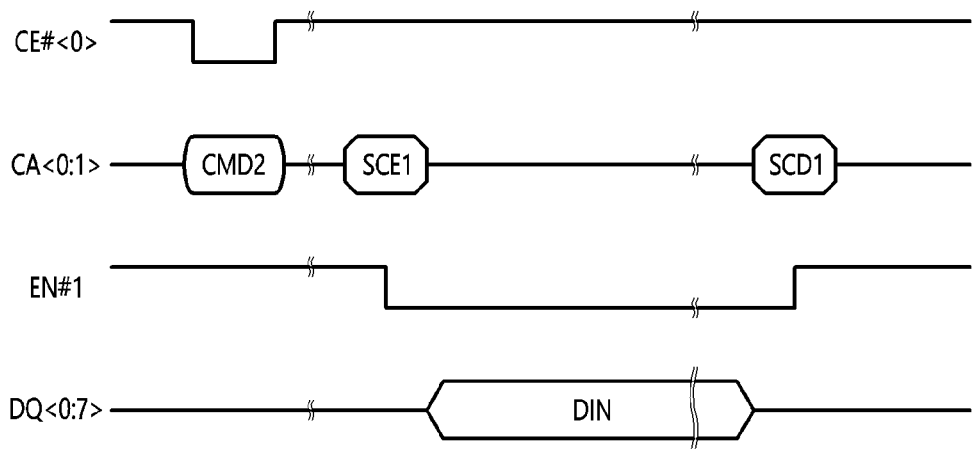
FIG. 2B is a diagram illustrating an operation of a semiconductor system according to an embodiment of the present technology.

FIG. 2B is a diagram illustrating an operation of the semiconductor system 100 according to an embodiment of the present technology. FIG. 2B may illustrate the data input operation performed by the first memory die DIE1 of FIG. 1. Referring to FIGS. 1 and 2B, the first semiconductor apparatus 110 may provide the second semiconductor apparatus 120 with the first chip enable signal CE#<0> and the command address signals CA<0:1> corresponding to the first command address signal set, to instruct the first memory die DIE1 to perform the data input operation. The first command address signal set may include the data input command CMD2. The first memory die DIE1 may receive the data input command CMD2 as a valid command based on the enabled first chip enable signal CE#<0>, and perform an internal operation based on the data input command CMD2. The control circuit 132 of the first memory die DIE1 may generate the memory cell array control signal MCS and the buffer control signal BCS based on the data input command CMD2, and the page buffer group 134 may reset the latch values of the latch circuits.

After providing the second semiconductor apparatus 120 with the first chip enable signal CE#<0> and the first command address signal set, the first semiconductor apparatus 110 may provide the second semiconductor apparatus 120 with the command address signals CA<0:1> corresponding the second command address signal set. When providing the second semiconductor apparatus 120 with the second command address signal set, the first semiconductor apparatus 110 might not provide the second semiconductor apparatus 120 with the first chip enable signal CE#<0>. The first semiconductor apparatus 110 may maintain the first chip enable signal CE#<0> in a disabled state. The second command address signal set may include selection information for selecting the first memory die DIE1, and include the first selection chip enable command SCE1 and the first selection chip disable command SCD1. After providing the second semiconductor apparatus 120 with the first chip enable signal CE#<0> and the first command address signal set, the first semiconductor apparatus 110 may provide the second semiconductor apparatus 120 with the first selection chip enable command SCE1. The control circuit 132 may enable the first data enable signal EN#1 based on the first selection chip enable command SCE1. When the first data enable signal EN#1 is enabled, the data input/output circuit 133 may be connected to the data bus 104. The first semiconductor apparatus 110 may provide the second semiconductor apparatus 120 with the data DQ<0:7> and DIN through the data bus 104 after providing the second semiconductor apparatus 120 with the first selection chip enable command SCE1. The data input/output circuit 133 may receive the data DIN through the data bus 104, parallelize the received data DIN, and generate the internal data DATA21 of the first memory die DIE1. The data input/output circuit 133 may provide the page buffer group 134 with the internal data DATA22. After providing the second semiconductor apparatus 120 with the data DIN, the first semiconductor apparatus 110 may provide the second semiconductor apparatus 120 with the first selection chip disable command SCE1. In an embodiment, the first semiconductor apparatus 110 may provide the second semiconductor apparatus 120 with the first selection chip disable command SCD1 at the point of time at which the data DIN is completely transmitted to the second semiconductor apparatus 120. In an embodiment, the first semiconductor apparatus 110 may provide the second semiconductor apparatus 120 with the first selection chip disable command SCD1 when a predetermined time elapses after providing the second semiconductor apparatus 120 with the first selection chip enable command SCE1. The control circuit 132 may disable the first data enable signal EN#1 based on the first selection chip disable command SCD1. When the first data enable signal EN#1 is disabled, the data input/output circuit 133 may be disconnected from the data bus 104.

FIG. 3A is a diagram illustrating an operation of the semiconductor system 100 according to an embodiment of the present technology. FIG. 3A may illustrate that the first and second memory dies DIE1 and DIE2 of FIG. 1 perform an interleaved data output operation. Referring to FIGS. 1 and 3A, the first semiconductor apparatus 110 may provide the second semiconductor apparatus 120 with the first chip enable signal CE#<0> and the command address signals CA<0:1> corresponding to the first command address signal set, to instruct the first memory die DIE1 to perform the data output operation. The first command address signal set may include the data output command CMD1. The first memory die DIE1 may receive the data output command CMD1 as a valid command based on the enabled first chip enable signal CE#<0>, and perform an internal operation based on the data output command CMD1. The control circuit 132 of the first memory die DIE1 may generate the memory cell array control signal MCS and the buffer control signal BCS based on the data output command CMD1, and the page buffer group 134 may read data stored in the memory cell array 131, and generate the internal data DATA21 of the first memory die DIE1. The data input/output circuit 133 may serialize the internal data DATA21, and generate the data DQ<0:7>.

After providing the second semiconductor apparatus 120 with the first chip enable signal CE#<0> and the first command address signal set, the first semiconductor apparatus 110 may provide the second semiconductor apparatus 120 with the command address signals CA<0:1> corresponding the second command address signal set. When providing the second semiconductor apparatus 120 with the second command address signal set, the first semiconductor apparatus 110 might not provide the second semiconductor apparatus 120 with the first chip enable signal CE#<0>. The first semiconductor apparatus 110 may maintain the first chip enable signal CE#<0> in a disabled state. The second command address signal set may include selection information for selecting the first memory die DIE1, and include the first selection chip enable command SCE1 and the first selection chip disable command SCD1. After providing the second semiconductor apparatus 120 with the first chip enable signal CE#<0> and the first command address signal set, the first semiconductor apparatus 110 may provide the second semiconductor apparatus 120 with the first selection chip enable command SCE1. The control circuit 132 may enable the first data enable signal EN#1 based on the first selection chip enable command SCE1. When the first data enable signal EN#1 is enabled, the data input/output circuit 133 may be connected to the data bus 104, and transmit the data DQ<0:7> and DOUT1 to the first semiconductor apparatus 110 through the data bus 104.

To allow the data output operation of the second memory die DIE2 to be performed in parallel, the first semiconductor apparatus 110 may provide the second semiconductor apparatus 120 with the first chip enable signal CE#<0> and the first command address signal set, and then provide the second semiconductor apparatus 120 with the second chip enable signal CE#<1> instructing the second memory die DIE2 to perform the data output operation and the command address signals CA<0:1> corresponding to the first command address signal set. The first command address signal set may include the data output command CMD1. The second memory die DIE2 may receive the data output command CMD1 as a valid command based on the enabled second chip enable signal CE#<1>, and perform an internal operation based on the data output command CMD1. Although FIG. 3A illustrates that the second chip enable signal CE#<1> and the data output command CMD1 are transmitted later than the first selection chip enable command SCE1, the point of time at which the first semiconductor apparatus 110 provides the second semiconductor apparatus 120 with the second chip enable signal CE#<1> and the data output command CMD1 may be earlier or later than the point of time at which the first semiconductor apparatus 110 provides the second semiconductor apparatus 120 with the first selection chip enable command SCE1. It may safely be said that the point of time at which the second chip enable signal CE#<1> and the data output command CMD1 are transmitted from the first semiconductor apparatus 110 to the second semiconductor apparatus 120 overlaps with the point of time at which the second semiconductor apparatus 120 transmits the data DQ<0:7> to the first semiconductor apparatus 110 through the data bus 104. Because the second chip enable signal CE#<1> is enabled when the data output command CMD1 is transmitted, the first memory die DIE1 might not receive the data output command CMD1 as a valid command. In addition, the second memory die DIE2 may be in a state of not being connected to the data bus 104.

The first semiconductor apparatus 110 may provide the second semiconductor apparatus 120 with the first selection chip disable command SCD1 after providing the second semiconductor apparatus 120 with the first selection chip enable command SCE1. The control circuit 132 may disable the first data enable signal EN#1 based on the first selection chip disable command SCD1. When the first data enable signal EN#1 is disabled, the data input/output circuit 133 may be disconnected from the data bus 104.

After providing the second semiconductor apparatus 120 with the first selection chip disable command SCD1, the first semiconductor apparatus 110 may provide the second semiconductor apparatus 120 with the command address signals CA<0:1> corresponding to the third command address signal set. When providing the second semiconductor apparatus 120 with the third command address signal set, the first semiconductor apparatus 110 might not provide the second semiconductor apparatus 120 with the second chip enable signal CE#<1>. The third command address signal set may include selection information for selecting the second memory die DIE2, and include the second selection chip enable command SCE2 and the second selection chip disable command SCD2. After providing the second semiconductor apparatus 120 with the second selection chip enable command SCE2, the first semiconductor apparatus 110 may provide the second semiconductor apparatus 120 with the second selection chip disable command SCD2. The control circuit 142 of the second die DIE2 may enable the second data enable signal EN#2 based on the second selection chip enable command SCE2. When the second data enable signal EN#2 is enabled, the data input/output circuit 143 may be connected to the data bus 104, and transmit the data DQ<0:7> and DOUT2 to the first semiconductor apparatus 110 through the data bus 104.

After providing the second semiconductor apparatus 120 with the second selection chip enable command SCE2, the first semiconductor apparatus 110 may provide the second semiconductor apparatus 120 with the second selection chip disable command SCD2. The control circuit 142 may disable the second data enable signal EN#2 based on the second selection chip disable command SCD2. When the second data enable signal EN#2 is disabled, the data input/output circuit 143 may be disconnected from the data bus 104. The first semiconductor apparatus 110 may provide the second semiconductor apparatus 120 with the first and second selection chip enable commands SCE1 and SCE2 and the first and second selection chip disable commands SCD1 and SCD2, and thus may independently set data output periods of the first and second memory dies DIE1 and DIE2, which makes it possible for the first and second memory dies DIE1 and DIE2 to perform the data output operation in parallel.

Figure 3B:
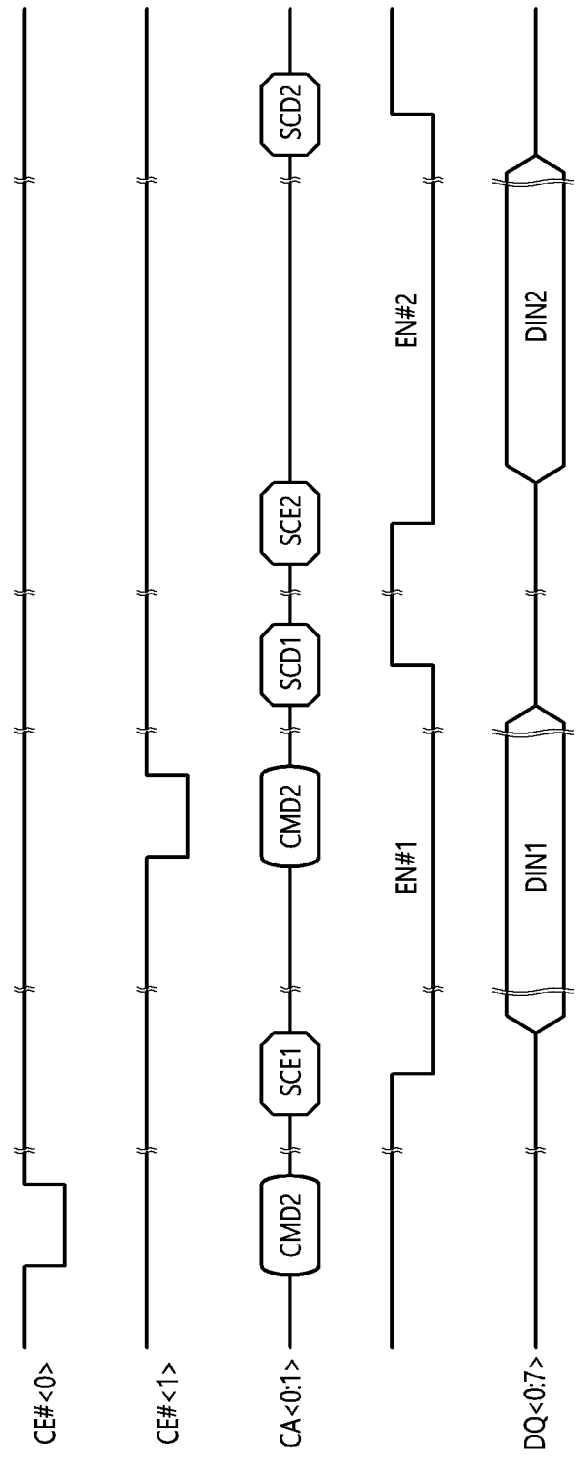
FIG. 3B is a diagram illustrating an operation of a semiconductor system according to an embodiment of the present technology.

FIG. 3B is a diagram illustrating an operation of the semiconductor system 100 according to an embodiment of the present technology. FIG. 3B may illustrate that the first and second memory dies DIE1 and DIE2 of FIG. 1 perform an interleaved data input operation. Referring to FIGS. 1 and 3B, the first semiconductor apparatus 110 may provide the second semiconductor apparatus 120 with the first chip enable signal CE#<0> and the command address signals CA<0:1> corresponding to the first command address signal set, to instruct the first memory die DIE1 to perform the data input operation. The first command address signal set may include the data input command CMD2. The first memory die DIE1 may receive the data input command CMD2 as a valid command based on the enabled first chip enable signal CE#<0>, and perform an internal operation based on the data input command CMD2. The control circuit 132 of the first memory die DIE1 may generate the memory cell array control signal MCS and the buffer control signal BCS based on the data input command CMD2, and the page buffer group 134 may reset the latch values of the latch circuits.

After providing the second semiconductor apparatus 120 with the first chip enable signal CE#<0> and the first command address signal set, the first semiconductor apparatus 110 may provide the second semiconductor apparatus 120 with the command address signals CA<0:1> corresponding to the second command address signal set. When providing the second semiconductor apparatus 120 with the second command address signal set, the first semiconductor apparatus 110 may maintain the first chip enable signal CE#<0> in a disabled state. The second command address signal set may include selection information for selecting the first memory die DIE1, and include the first selection chip enable command SCE1 and the first selection chip disable command SCD1. After providing the second semiconductor apparatus 120 with the first chip enable signal CE#<0> and the first command address signal set, the first semiconductor apparatus 110 may provide the second semiconductor apparatus 120 with the first selection chip enable command SCE1. The control circuit 132 may enable the first data enable signal EN#1 based on the first selection chip enable command SCE1. When the first data enable signal EN#1 is enabled, the data input/output circuit 133 may be connected to the data bus 104. After providing the second semiconductor apparatus 120 with the first selection chip enable command SCE1, the first semiconductor apparatus 110 may provide the second semiconductor apparatus 120 with the data DQ<0:7> and DIN1. The data input/output circuit 133 may receive the data DIN1 through the data bus 104, parallelize the received data DIN1, and generate the internal data DATA21 of the first memory die DIE1.

To allow the data input operation of the second memory die DIE2 to be performed in parallel, the first semiconductor apparatus 110 may provide the second semiconductor apparatus 120 with the first chip enable signal CE#<0> and the first command address signal set, and then provide the second semiconductor apparatus 120 with the second chip enable signal CE#<1> instructing the second memory die DIE2 to perform the data input operation and the command address signals CA<0:1> corresponding to the first command address signal set. The first command address signal set may include the data input command CMD2. The second memory die DIE2 may receive the data input command CMD2 as a valid command based on the enabled second chip enable signal CE#<1>, and perform an internal operation based on the data input command CMD2. Although FIG. 3B illustrates that the second chip enable signal CE#<1> and the data input command CMD2 are transmitted later than the first selection chip enable command SCE1, the point of time at which the first semiconductor apparatus 110 provides the second semiconductor apparatus 120 with the second chip enable signal CE#<1> and the data input command CMD2 may be earlier or later than the point of time at which the first semiconductor apparatus 110 provides the second semiconductor apparatus 120 with the first selection chip enable command SCE1. It may safely be said that the point of time at which the second chip enable signal CE#<1> and the data input command CMD2 are transmitted from the first semiconductor apparatus 110 to the second semiconductor apparatus 120 overlaps with the point of time at which the first semiconductor apparatus 110 transmits the data DIN1 to the second semiconductor apparatus 120 through the data bus 104. Because the second chip enable signal CE#<1> is enabled when the data input command CMD2 is transmitted, the first memory die DIE1 might not receive the data input command CMD2 as a valid command. In addition, because the second memory die DIE2 is in a state of not being connected to the data bus 104, the second memory die DIE2 might not receive the data DIN1 from the first semiconductor apparatus 110.

The first semiconductor apparatus 110 may provide the second semiconductor apparatus 120 with the first selection chip disable command SCD1 after providing the second semiconductor apparatus 120 with the data DIN1. The control circuit 132 may disable the first data enable signal EN#1 based on the first selection chip disable command SCD1. When the first data enable signal EN#1 is disabled, the data input/output circuit 133 may be disconnected from the data bus 104.

After providing the second semiconductor apparatus 120 with the first selection chip disable command SCD1, the first semiconductor apparatus 110 may provide the second semiconductor apparatus 120 with the command address signals CA<0:1> corresponding to the third command address signal set. When providing the second semiconductor apparatus 120 with the third command address signal set, the first semiconductor apparatus 110 may maintain the second chip enable signal CE#<1> in a disabled state. The third command address signal set may include selection information for selecting the second memory die DIE2, and include the second selection chip enable command SCE2 and the second selection chip disable command SCD2. After providing the second semiconductor apparatus 120 with the second selection chip enable command SCE2, the first semiconductor apparatus 110 may provide the second semiconductor apparatus 120 with the second selection chip disable command SCD2. The control circuit 142 may enable the second data enable signal EN#2 based on the second selection chip enable command SCE2. When the second data enable signal EN#2 is enabled, the data input/output circuit 143 may be connected to the data bus 104.

After providing the second semiconductor apparatus 120 with the second selection chip enable command SCE2, the first semiconductor apparatus 110 may provide the second semiconductor apparatus 120 with the data DQ<0:7> and DIN2. The data input/output circuit 144 may receive the data DIN2 through the data bus 104, parallelize the received data DIN2, and generate the internal data DATA22 of the second memory die DIE2. After providing the second semiconductor apparatus 120 with the data DIN2, the first semiconductor apparatus 110 may provide the second semiconductor apparatus 120 with the second selection chip disable command SCD2. The control circuit 142 may disable the second data enable signal EN#2 based on the second selection chip disable command SCD2. When the second data enable signal EN#2 is disabled, the data input/output circuit 143 may be disconnected from the data bus 104. The first semiconductor apparatus 110 may provide the second semiconductor apparatus 120 with the first and second selection chip enable commands SCE1 and SCE2 and the first and second selection chip disable commands SCD1 and SCD2, and thus may independently set data input periods of the first and second memory dies DIE1 and DIE2, which makes it possible for the first and second memory dies DIE1 and DIE2 to perform the data input operation in parallel.

Figure 4:
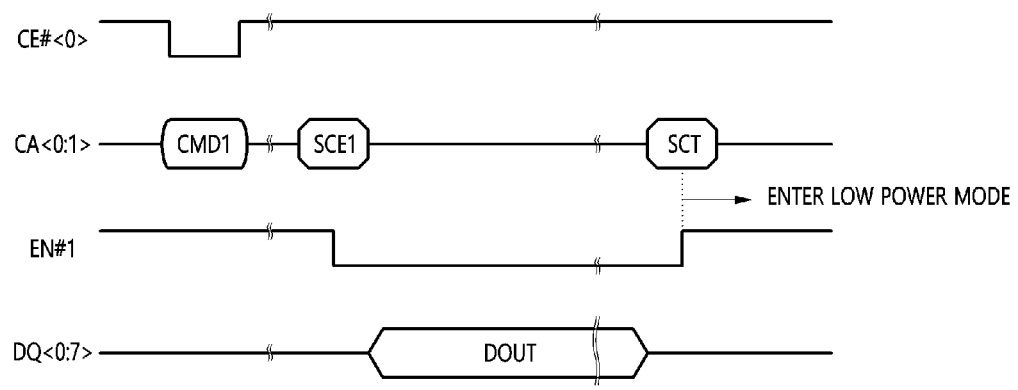
FIG. 4 is a diagram illustrating an operation of a semiconductor system according to an embodiment of the present technology.

FIG. 4 is a diagram illustrating an operation of the semiconductor system 100 according to an embodiment of the present technology. FIG. 4 may illustrate that the first memory die DIE1 of FIG. 1 performs the data output operation. Referring to FIGS. 1 and 4, the first semiconductor apparatus 110 may provide the second semiconductor apparatus 120 with the first chip enable signal CE#<0> and the command address signals CA<0:1> corresponding to the first command address signal set, to instruct the first memory die DIE1 to perform the data output operation. The first command address signal set may include the data output command CMD1. The control circuit 132 of the first memory die DIE1 may receive the data output command CMD1 as a valid command based on the enabled first chip enable signal CE#<0>, and perform an internal operation based on the data output command CMD1. After providing the second semiconductor apparatus 120 with the first chip enable signal CE#<0> and the first command address signal set, the first semiconductor apparatus 110 may provide the second semiconductor apparatus 120 with the second command address signal set. When providing the second semiconductor apparatus 120 with the second command address signal set, the first semiconductor apparatus 110 may maintain the first chip enable signal CE#<0> in a disabled state. The second command address signal set may include selection information for selecting the first memory die DIE1, and include the first selection chip enable command SCE1 and a first selection chip termination command SCT1. After providing the second semiconductor apparatus 120 with the first chip enable signal CE#<0> and the data output command CMD1, the first semiconductor apparatus 110 may provide the second semiconductor apparatus 120 with the first selection chip enable command SCE1. The control circuit 132 may enable the first data enable signal EN#1 based on the first selection chip enable command SCE1. When the first data enable signal EN#1 is enabled, the data input/output circuit 133 may be connected to the data bus 104, and transmit the data DQ<0:7> and DOUT to the first semiconductor apparatus 110 through the data bus 104. After providing the second semiconductor apparatus 120 with the first selection chip enable command SCE1, the first semiconductor apparatus 110 may provide the second semiconductor apparatus 120 with the first selection chip termination command SCT1. When the first memory die DIE1 does not need to perform another operation other than the data output operation instructed by the data output command CMD1, the first semiconductor apparatus 110 may provide the second semiconductor apparatus 120 with the first selection chip termination command SCT1 instead of the first selection chip disable command SCD1 of FIG. 2A. In an embodiment, the first semiconductor apparatus 110 may provide the second semiconductor apparatus 120 with the first selection chip termination command SCT1 at the point of time at which the data DOUT is completely transmitted from the second semiconductor apparatus 120. In an embodiment, the first semiconductor apparatus 110 may provide the second semiconductor apparatus 120 with the first selection chip termination command SCT1 when a predetermined time elapses after providing the second semiconductor apparatus 120 with the first selection chip enable command SCE1. The control circuit 132 may disable the first data enable signal EN#1 based on the first selection chip termination command SCT1. When the first data enable signal EN#1 is disabled, the data input/output circuit 133 may be disconnected from the data bus 104. In addition, the first memory die DIE1 may enter a low power mode based on the first selection chip termination command SCT1. The low power mode may be a standby mode in which a normal operation is not performed, and may include a power-down mode, a deep power-down mode, and a sleep mode. In FIG. 2A, when the first semiconductor apparatus 110 provides the first selection chip disable command SCD1, the first memory die DIE1 may be in a ready state, not the low power mode, and maintain an activated state to perform another operation. When the first memory die DIE1 does not need to perform another operation, the first semiconductor apparatus 110 may need to allow the first memory die DIE1 to enter the low power mode by typically providing a low power mode entry command. The first semiconductor apparatus 110 may disconnect the first memory die 110 from the data bus 104 by providing the first selection chip termination command SCT1, and instruct the first memory die DIE1 to enter the low power mode. Accordingly, the number of commands used when the first memory die DIE1 enters the low power mode and command overhead may be reduced, and performance of the semiconductor system 100 may be improved.

Figure 5:
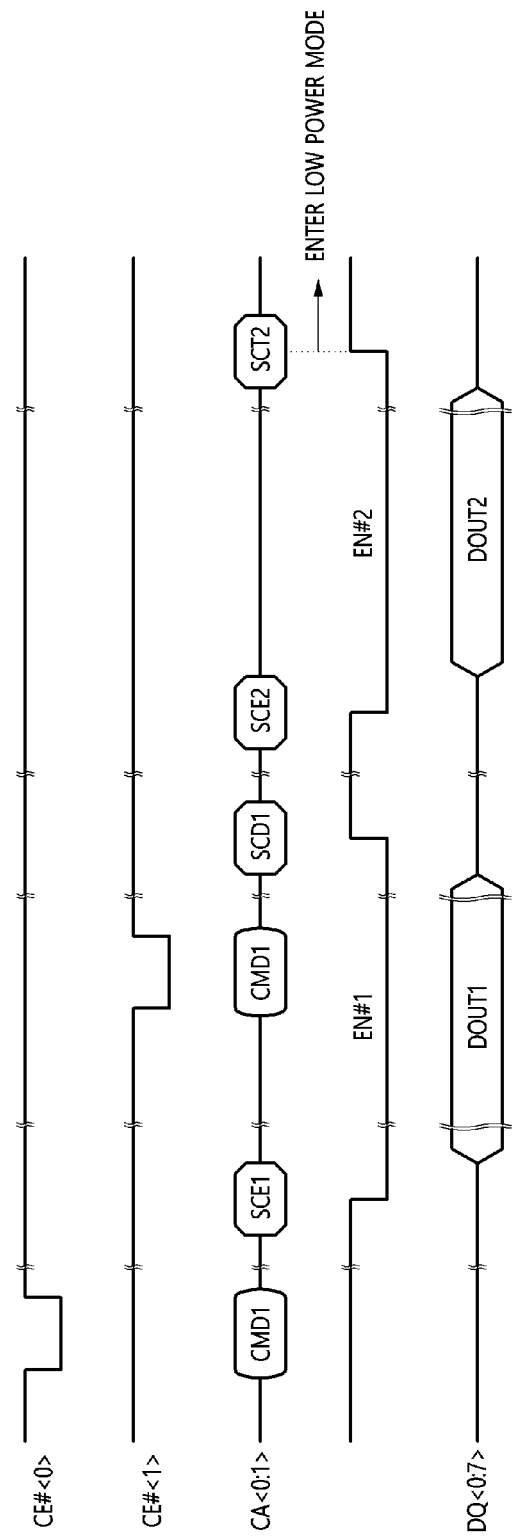
FIG. 5 is a diagram illustrating an operation of a semiconductor system according to an embodiment of the present technology.

FIG. 5 is a diagram illustrating an operation of the semiconductor system 100 according to an embodiment of the present technology. FIG. 5 may illustrate that the first and second memory dies DIE1 and DIE2 of FIG. 1 perform an interleaved data output operation. Referring to FIGS. 1 and 5, the first semiconductor apparatus 110 may provide the second semiconductor apparatus 120 with the first chip enable signal CE#<0> and the command address signals CA<0:1> corresponding to the first command address signal set, to instruct the first memory die DIE1 to perform the data output operation. The first command address signal set may include the data output command CMD1. The first memory die DIE1 may receive the data output command CMD1 as a valid command based on the enabled first chip enable signal CE#<0>, and perform an internal operation based on the data output command CMD1.

After providing the second semiconductor apparatus 120 with the first chip enable signal CE#<0> and the first command address signal set, the first semiconductor apparatus 110 may provide the second semiconductor apparatus 120 with the first selection chip enable command SCE1. The control circuit 132 may enable the first data enable signal EN#1 based on the first selection chip enable command SCE1. When the first data enable signal EN#1 is enabled, the data input/output circuit 133 may be connected to the data bus 104, and transmit the data DQ<0:7> and DOUT1 to the first semiconductor apparatus 110 through the data bus 104.

To allow the data output operation of the second memory die DIE2 to be performed in parallel, the first semiconductor apparatus 110 may provide the second semiconductor apparatus 120 with the first chip enable signal CE#<0> and the first command address signal set, and then provide the second semiconductor apparatus 120 with the second chip enable signal CE#<1> instructing the second memory die DIE2 to perform the data output operation and the command address signals CA<0:1> corresponding to the first command address signal set. The first command address signal set may include the data output command CMD1. The second memory die DIE2 may receive the data output command CMD1 as a valid command based on the enabled second chip enable signal CE#<1>, and perform an internal operation based on the data output command CMD1.

After providing the second semiconductor apparatus 120 with the first selection chip enable command SCE1, the first semiconductor apparatus 110 may provide the second semiconductor apparatus 120 with the first selection chip disable command SCD1. The control circuit 132 may disable the first data enable signal EN#1 based on the first selection chip disable command SCD1. When the first data enable signal EN#1 is disabled, the data input/output circuit 133 may be disconnected from the data bus 104, and the first memory die DIE1 may be in a ready state where another operation can be performed. In an embodiment, when the first memory die DIE1 does not need to perform another operation, the first semiconductor apparatus 110 may provide the second semiconductor apparatus 120 with the first selection chip termination command SCT1 illustrated in FIG. 4 instead of the first selection chip disable command SCD1. When the first selection chip termination command SCT1 is provided from the first semiconductor apparatus 110, the first memory die DIE1 may enter a low power mode.

After providing the second semiconductor apparatus 120 with the first selection chip disable command SCD1, the first semiconductor apparatus 110 may provide the second semiconductor apparatus 120 with the second selection chip enable command SCE2. The control circuit 142 may enable the second data enable signal EN#2 based on the second selection chip enable command SCE2. When the second data enable signal EN#2 is enabled, the data input/output circuit 143 may be connected to the data bus 104, and transmit the data DQ<0:7> and DOUT2 to the first semiconductor apparatus 110 through the data bus 104.

After providing the second semiconductor apparatus 120 with the second selection chip enable command SCE2, the first semiconductor apparatus 110 may provide the second semiconductor apparatus 120 with the second selection chip termination command SCT2. The control circuit 142 may disable the second data enable signal EN#2 based on the second selection chip termination command SCT2. When the second data enable signal EN#2 is disabled, the data input/output circuit 143 may be disconnected from the data bus 104. In addition, the second memory die DIE2 may enter the low power mode based on the second selection chip termination command SCT2. In an embodiment, when the second memory die DIE2 needs to perform another operation, the first semiconductor apparatus 110 may provide the second semiconductor apparatus 120 with the second selection chip disable command SCD2 illustrated in FIG. 3A instead of the second selection chip termination command SCT2. When the second selection chip disable command SCD2 is provided from the first semiconductor apparatus 110, the second memory die DIE2 may be in a ready state where another operation can be performed, without entering the low power mode.

Figure 6:
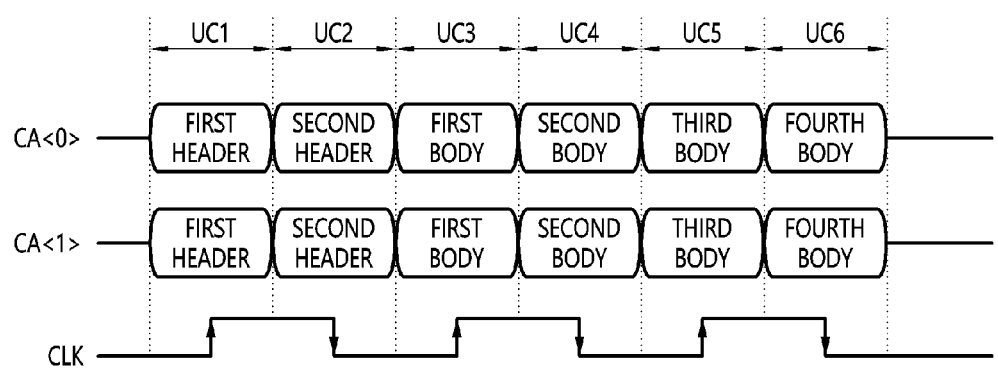
FIG. 6 is a diagram illustrating a construction of a command address signal according to an embodiment of the present technology.

FIG. 6 is a diagram illustrating constructions of the command address signals CA<0> and CA<1> according to an embodiment of the present technology. Referring to FIG. 6, the command address signals CA<0> and CA<1> transmitted during a unit cycle may include 2 bits, and a total of 12-bit command address signals transmitted during 6 unit cycles may constitute one command address signal set. A first header and a second header of the command address signal set may be transmitted during a first unit cycle UC1 and a second unit cycle UC2, respectively. During the first unit cycle UC1, the first and second bits CA<0> and CA<1> of the first header may be transmitted, and during the second unit cycle UC2, the first and second bits CA<0> and CA<1> of the second header may be transmitted. A first body, a second body, a third body and a fourth body of the command address signal set may be transmitted during a third unit cycle UC3, a fourth unit cycle UC4, a fifth unit cycle UC5 and a sixth unit cycle UC6, respectively. During the third unit cycle US3, the first and second bits CA<0> and CA<1> of the first body may be transmitted, and during the fourth unit cycle UC4, the first and second bits CA<0> and CA<1> of the second body may be transmitted. During the fifth unit cycle UC5, the first and second bits CA<0> and CA<1> of the third body may be transmitted, and during the sixth unit cycle UC6, the first and second bits CA<0> and CA<1> of the fourth body may be transmitted. The command address signal set may be transmitted in synchronization with the command clock signal CCK. The command address signals CA<0> and CA<1> may be transmitted in synchronization with rising edges and falling edges of the command clock signal CCK. For example, the first unit cycle UC1 may be synchronized with a first rising edge of the command clock signal CCK, and the first and second bits CA<0> and CA<1> of the first header may be transmitted in synchronization with the first rising edge of the command clock signal CCK. The second unit cycle UC2 may be synchronized with a first falling edge of the command clock signal CCK, and the first and second bits CA<0> and CA<1> of the second header may be transmitted in synchronization with the first falling edge of the command clock signal CCK. The third unit cycle UC3 may be synchronized with a second rising edge of the command clock signal CCK, and the first and second bits CA<0> and CA<1> of the first body may be transmitted in synchronization with the second rising edge of the command clock signal CCK. The fourth unit cycle UC4 may be synchronized with a second falling edge of the command clock signal CCK, and the first and second bits CA<0> and CA<1> of the second body may be transmitted in synchronization with the second falling edge of the command clock signal CCK. The fifth unit cycle UC5 may be synchronized with a third rising edge of the command clock signal CCK, and the first and second bits CA<0> and CA<1> of the third body may be transmitted in synchronization with the third rising edge of the command clock signal CCK. The sixth unit cycle UC6 may be synchronized with a third falling edge of the command clock signal CCK, and the first and second bits CA<0> and CA<1> of the fourth body may be transmitted in synchronization with the third falling edge of the command clock signal CCK.

FIG. 7 is a table illustrating the command address signal set according to an embodiment of the present technology. Referring to FIG. 7, the command address signal set may specify characteristics and/or types of the command address signal set depending on logic levels of the bits CA<0> and CA<1> of the first and second headers. When the first and second bits CA<0> and CA<1> of the first and second headers each have a low logic level, the command address signal set may correspond to the data output command Data Output. When the first and second bits CA<0> and CA<1> of the first header and the first bit CA<0> of the second header each have the low logic level, and the second bit CA<1> of the second header has a high logic level, the command address signal set may correspond to the data input command Data Input. When the first bit CA<0> of the first header has the high logic level, and the second bit CA<1> of the first header and the first and second bits CA<0> and CA<1> of the second header each have the low logic level, the command address signal set may correspond to address input Address Input, and the bodies transmitted after the first and second headers may be provided as address signals. When the first bit CA<0> of the first header and the first and second bits CA<0> and CA<1> of the second header each have the low logic level, and the second bit CA<1> of the first header has the high logic level, the command address signal set may correspond to command input Command Input, and the bodies transmitted after the first and second headers may include information about the type of commands defined by the command address signal set.

When the first and second bits CA<0> and CA<1> of the first header and the first bit CA<0> of the second header each have the high logic level, and the second bit CA<1> of the second header has the low logic level, the command address signal set may correspond to the selection chip enable command SCE. The bodies transmitted after the first and second headers may include selection information for selecting a memory die receiving the selection chip enable command SCE. When the first and second bits CA<0> and CA<1> of the first header and the second bit CA<1> of the second header each have the high logic level, and the first bit CA<0> of the second header has the low logic level, the command address signal set may correspond to the selection chip disable command SCD. The bodies transmitted after the first and second headers may include selection information for selecting a memory die receiving the selection chip disable command SCD. When the first and second bits CA<0> and CA<1> of the first header and the first and second bits CA<0> and CA<1> of the second header each have the high logic level, the command address signal set may correspond to the selection chip termination command SCT. The bodies transmitted after the first and second headers may include selection information for selecting a memory die receiving the selection chip termination command SCT. When the first and second bits CA<0> and CA<1> of the first header each have the high logic level, and the first and second bits CA<0> and CA<1> of the second header each have the low logic level, the command address signal set may correspond to a logical unit number (LUN) selection command LUN Selection. The bodies transmitted after the first and second headers may include selection information for selecting a memory die receiving the LUN selection command LUN Selection.

The first and second bits CA<0> and CA<1> of the first to fourth bodies transmitted after the first and second headers of the selection chip enable command SCE, the selection chip disable command SCD, the selection chip termination command SCT, and the LUN selection command LUN Selection may be used as information for selecting a plurality of memory dies. The first and second bits CA<0> and CA<1> of the first and fourth bodies may be used as information for selecting different memory dies, and 256 different memory dies may be selected independently by logic values of the body bits. For example, when the first bit of the first body to the second bit of the fourth body S0, S1, S2, S3, S4, S5, S6 and S7 each have the low logic level, a first memory die may be selected. When the first bit S0 of the first body has the high logic level, and the second bit of the first body to the second bit of the fourth body S1, S2, S3, S4, S5, S6 and S7 each have the low logic level, a second memory die may be selected. When the second bit S1 of the first body has the high logic level, and the first bit S0 of the first body and the first bit of the second body to the second bit of the fourth body S2, S3, S4, S5, S6 and S7 each have the low logic level, a third memory die may be selected. When the first bit of the first body to the second bit of the fourth body S0, S1, S2, S3, S4, S5, S6 and S7 each have the high logic level, a $256^{th}$ memory die may be selected. The control circuits 132 and 142 illustrated in FIG. 1 may determine logic levels of header bits and body bits constituting the command address signal set, and receive the command address signal set as the data output command CMD1, the data input command CMD2, the first selection chip enable command SCE1, the first selection chip disable command SCD1, the first selection chip termination command SCT1, the second selection chip enable command SCE2, the second selection chip disable command SCD2, and the second selection chip termination command SCT2.

Figure 8A:
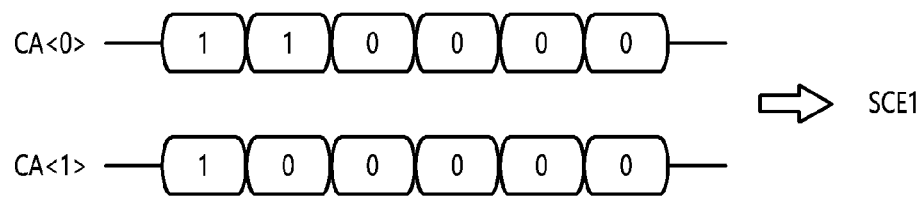
FIG. 8A is a diagram illustrating an example of a construction of a selection chip enable command according to an embodiment of the present technology.

FIG. 8A is a diagram illustrating an example of a construction of the selection chip enable command according to an embodiment of the present technology. When the first and second bits CA<0> and CA<1> of the first header of the command address signal set and the first bit CA<0> of the second header each have the high logic level, and the second bit CA<1> of the second header has the low logic level, the command address signal set may correspond to the selection chip enable command SCE of FIG. 7. Because all body bits each have the low logic level, the command address signal set may include selection information for selecting the first memory die DIE1. Accordingly, the command address signal set may correspond to the first selection chip enable command SCE1 illustrated in FIGS. 2A to 5.

Figure 8B:
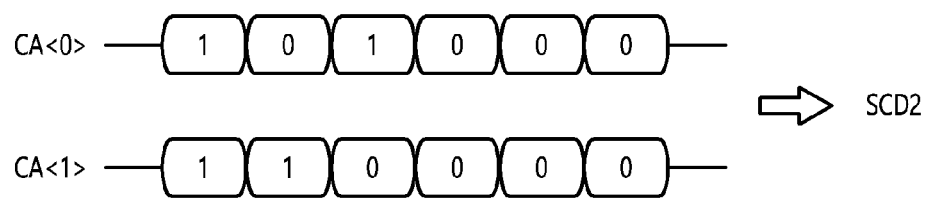
FIG. 8B is a diagram illustrating an example of a construction of a selection chip disable command according to an embodiment of the present technology.

FIG. 8B is a diagram illustrating an example of a construction of the selection chip disable command according to an embodiment of the present technology. When the first and second bits CA<0> and CA<1> of the first header of the command address signal set and the second bit CA<1> of the second header each have the high logic level, and the first bit CA<0> of the second header has the low logic level, the command address signal set may correspond to the selection chip disable command SCD of FIG. 7. Because the first bit CA<0> of the first body has the high logic level and all other body bits each have the low logic level, the command address signal set may include selection information for selecting the second memory die DIE2. Accordingly, the command address signal set may correspond to the second selection chip disable command SCD2 illustrated in FIGS. 3A, 3B and 5.

Figure 9:
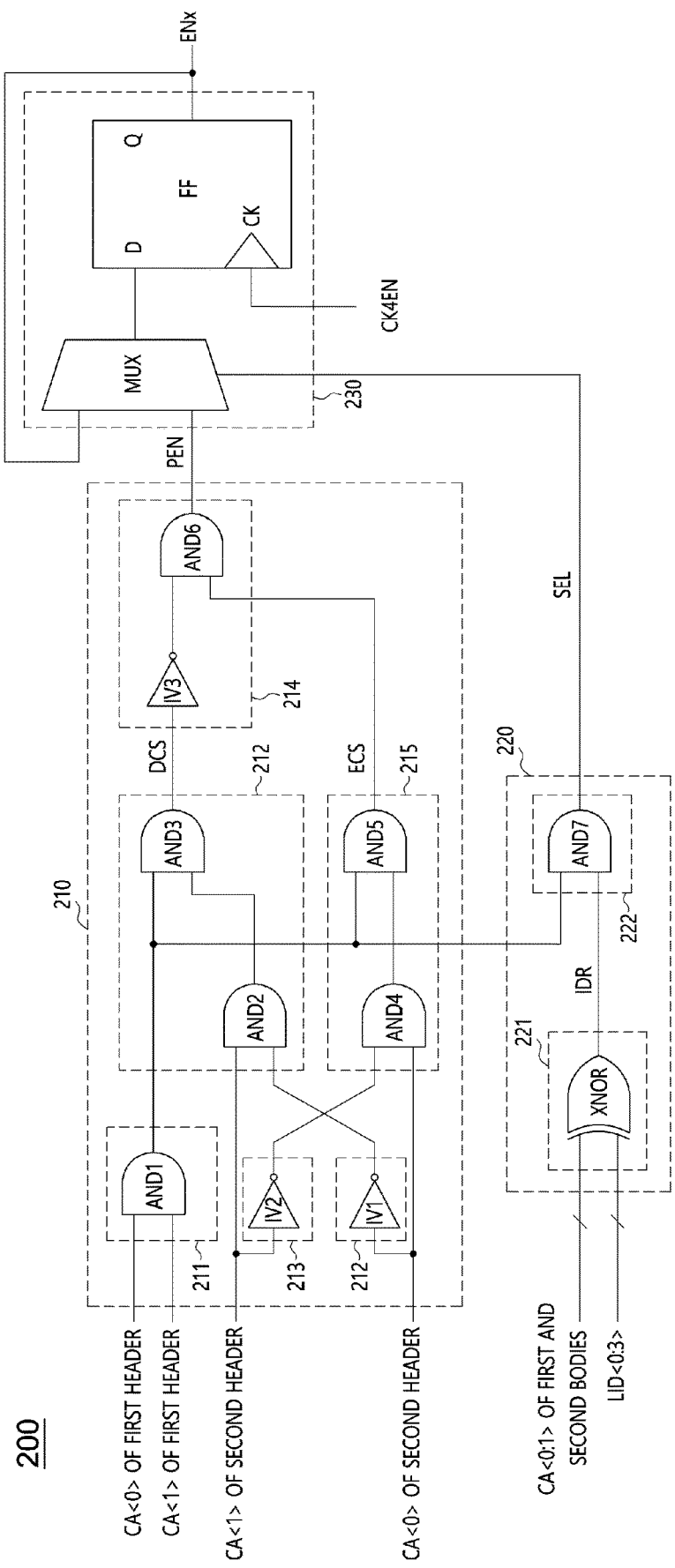
FIG. 9 is a diagram illustrating a construction of a control circuit according to an embodiment of the present technology.

FIG. 9 is a diagram illustrating a construction of a control circuit 200 according to an embodiment of the present technology. The control circuit 200 may be applied as at least a part of each of the control circuits 132 and 142 illustrated in FIG. 1. Referring to FIG. 9, the control circuit 200 may receive the command address signal set, and when the command address signal set includes a selection chip enable command, and a selection chip disable command, the control circuit 200 may generate a data enable signal ENx based on the selection chip enable command and the selection chip disable command. Each of the selection chip enable command and the selection chip disable command may include the first and second bits CA<0> and CA<1> of the first header, the first and second bits CA<0> and CA<1> of the second header, the first and second bits CA<0:1> of the first body, and the first and second bits CA<0:1> of the second body. The data enable signal ENx may be a signal provided to the data input/output circuits 133 and 143 illustrated in FIG. 1, and may be a signal that selectively connects the data input/output circuits 133 and 143 to the data bus 104. The control circuit 200 may enable the data enable signal ENx based on logic values of headers and selection information included in the selection chip enable command. The control circuit 200 may disable the data enable signal ENx based on logic values of headers and selection information included in the selection chip disable command.

The control circuit 200 may include a control signal generation circuit 210, a selection signal generation circuit 220, and a data enable signal generation circuit 230. The control signal generation circuit 210 may receive the first and second bits CA<0> and CA<1> of the first header and the first and second bits CA<0> and CA<1> of the second header, and generate a preliminary data enable signal PEN based on logic values of the first and second bits CA<0> and CA<1> of the first header and logic values of the first and second bits CA<0> and CA<1> of the second header. When the first and second bits CA<0> and CA<1> of the first and second headers each have a specific logic value, the control signal generation circuit 210 may enable or disable the preliminary data enable signal PEN. When the first and second bits CA<0> and CA<1> of the first header and the first bit CA<0> of the second header each have a first logic level, and the second bit CA<1> of the second header has a second logic level, the control signal generation circuit 210 may enable the preliminary data enable signal PEN. When the first and second bits CA<0> and CA<1> of the first header and the second bit CA<1> of the second header each have the first logic level, and the first bit CA<0> of the second header has the second logic level, the control signal generation circuit 210 may disable the preliminary data enable signal PEN.

The selection signal generation circuit 220 may generate a selection signal SEL based on the first and second bits CA<0> and CA<1> of the first header, the first and second bits CA<0:1> of the first and second bodies, and memory die identification information LID<0:3>. The selection signal generation circuit 220 may compare the bits CA<0:1> of the first and second bodies with the memory die identification information LID<0:3>, and generate a LUN identification result IDR. The memory die identification information LID<0:3>, which is for specifying an LUN of a memory die including the control circuit 200, may be information provided from the first semiconductor apparatus 110 of FIG. 1. The first semiconductor apparatus 110 may allocate different memory die identification information LID<0:3> to a plurality of memory dies. For example, different memory die identification information may be allocated to the first memory die DIE1 and second memory die DIE2 of FIG. 1. The memory die identification information LID<0:3> may be allocated with the same value as the selection information included in the selection chip enable command and the selection chip disable command. The memory die identification information LID<0:3> may include the same number of bits as the bits CA<0:1> of the first and second bodies. For example, the memory die identification information LID<0:3> may include 4 bits. When the control circuit 200 is included in the first memory die DIE1, all the bits LID<0:3> of the memory die identification information may each have a low logic level. When the control circuit 200 is included in the second memory die DIE2, the first bit LID<0> of the memory die identification information may have a high logic level, and the other bits LID<1:3> may each have the low logic level. The selection signal generation circuit 220 may enable the LUN identification result IDR when the bits CA<0:1> of the first and second bodies and the memory die identification information LID<0:3> coincide. The selection signal generation circuit 220 may disable the LUN identification result IDR when the bits CA<0:1> of the first and second bodies and the memory die identification information LID<0:3> do not coincide. The selection signal generation circuit 220 may generate the selection signal SEL based on the bits CA<0> and CA<1> of the first header and the LUN identification result IDR. The selection signal generation circuit 220 may output the LUN identification result IDR as the selection signal SEL when the selection chip enable command and the selection chip disable command are received so that the bits CA<0> and CA<1> of the first header each have the first logic level.

The data enable signal generation circuit 230 may generate the data enable signal ENx based on the preliminary data enable signal PEN, the selection signal SEL, and the data enable signal ENx. When the selection signal SEL is enabled, the data enable signal generation circuit 230 may output the preliminary data enable signal PEN as the data enable signal ENx. When the selection signal SEL is disabled, the data enable signal generation circuit 230 may maintain a state of the data enable signal ENx. The data enable signal generation circuit 230 may further receive a clock signal CK4EN, and update the state of the data enable signal ENx based on the clock signal CK4EN. For example, the clock signal CK4EN may be generated based on the command clock signal CCK of FIG. 1, and a cycle of the clock signal CK4EN may be three times a cycle of the command clock signal CCK.

The control signal generation circuit 210 may include a header determination circuit 211, a disable determination circuit 212, an enable determination circuit 213, and a first logic circuit 214. The header determination circuit 211 may receive the first and second bits CA<0> and CA<1> of the first header, and generate a header determination signal HDS. The header determination circuit 211 may enable the header determination signal HDS to the first logic level when the first and second bits CA<0> and CA<1> of the first header each have the first logic level. The header determination circuit 211 may disable the header determination signal HDS to the second logic level when even either one of the first and second bits CA<0> and CA<1> of the first header has the second logic level. The disable determination circuit 212 may generate a disable control signal DCS based on the header determination signal HDS and the logic levels of the first and second bits CA<0> and CA<1> of the second header. The disable determination circuit 212 may enable the disable control signal DCS when the header determination signal HDS is enabled, the first bit CA<0> of the second header has the low logic level, and the second bit CA<1> of the second header has the high logic level. The enable determination circuit 213 may generate an enable control signal ECS based on the header determination signal HDS and the logic levels of the first and second bits CA<0> and CA<1> of the second header. The enable determination circuit 213 may enable the enable control signal ECS when the header determination signal HDS is enabled, the first bit CA<0> of the second header has the high logic level, and the second bit CA<1> of the second header has the low logic level. The first logic circuit 214 may generate the preliminary data enable signal PEN based on the disable control signal DCS and the enable control signal ECS. The first logic circuit 214 may enable the preliminary data enable signal PEN when the enable control signal ECS is enabled, and the disable control signal DCS is disabled. The first logic circuit 214 may disable the preliminary data enable signal PEN when the disable control signal DCS is enabled or the enable control signal ECS is disabled.

The header determination circuit 211 may include a first AND gate AND1. A first input terminal of the first AND gate AND1 may receive the first bit CA<0> of the first header, and a second input terminal of the first AND gate AND1 may receive the second bit CA<1> of the first header. The header determination signal HDS may be outputted from an output terminal of the first AND gate AND1. The header determination circuit 211 may enable the header determination signal HDS to the high logic level when the first and second bits CA<0> and CA<1> of the first header each have the high logic level.

The disable determination circuit 212 may include a first inverter IV1, a second AND gate AND2, and a third AND gate AND3. The first inverter IV1 may receive the first bit CA<0> of the second header, and invert and drive the first bit CA<0> of the second header. A first input terminal of the second AND gate AND2 may receive the second bit CA<1> of the second header, and a second input terminal of the second AND gate AND2 may receive output of the first inverter IV1. A first input terminal of the third AND gate AND3 may receive the header determination signal HDS, and a second input terminal of the third AND gate AND3 may receive output of the second AND gate AND2. The disable control signal DCS may be outputted from an output terminal of the third AND gate AND3. The disable determination circuit 212 may enable the disable control signal DCS to the high logic level when the header determination signal HDS has the high logic level, the first bit CA<0> of the second header has the low logic level, and the second bit CA<1> of the second header has the high logic level.

The enable determination circuit 213 may include a second inverter IV2, a fourth AND gate AND4, and a fifth AND gate AND5. The second inverter IV2 may receive the second bit CA<1> of the second header, and invert and drive the second bit CA<1> of the second header. A first input terminal of the fourth AND gate AND4 may receive output of the second inverter IV2, and a second input terminal of the fourth AND gate AND4 may receive the first bit CA<1> of the second header. A first input terminal of the fifth AND gate AND5 may receive the header determination signal HDS, and a second input terminal of the fifth AND gate AND5 may receive output of the fourth AND gate AND4. The enable control signal ECS may be outputted from an output terminal of the fifth AND gate AND5. The enable determination circuit 213 may enable the enable control signal ECS to the high logic level when the header determination signal HDS has the high logic level, the first bit CA<0> of the second header has the high logic level, and the second bit CA<1> of the second header has the low logic level.

The first logic circuit 214 may include a third inverter IV3 and a sixth AND gate AND6. The third inverter IV3 may receive the disable control signal DCS, and invert and drive the disable control signal DCS. A first input terminal of the sixth AND gate AND6 may receive output of the third inverter IV3, and a second input terminal of the sixth AND gate AND6 may receive the enable control signal ECS. The preliminary data enable signal PEN may be outputted from an output terminal of the sixth AND gate AND6. The first logic circuit 214 may enable the preliminary data enable signal PEN to the high logic level when the enable control signal ECS is enabled to the high logic level, and the disable control signal DCS is disabled to the low logic level. The first logic circuit 214 may disable the preliminary data enable signal PEN to the low logic level when the disable control signal DCS is enabled to the high logic level, and the enable control signal ECS is disabled to the low logic level.

The selection signal generation circuit 220 may include a comparison circuit 221 and a second logic circuit 222. The comparison circuit 221 may receive the bits CA<0:1> of the first and second bodies and the memory die identification information LID<0:3>. The comparison circuit 221 may compare the bits CA<0:1> of the first and second bodies with the memory die identification information LID<0:3>, and generate the LUN identification result IDR. The comparison circuit 221 may enable the LUN identification result IDR when the logic values of the bits CA<0:1> of the first and second bodies coincide with the logic values of the memory die identification information LID<0:3>. The comparison circuit 221 may disable the LUN identification result IDR when the logic values of the bits CA<0:1> of the first and second bodies do not coincide with the logic values of the memory die identification information LID<0:3>. The second logic circuit 222 may receive the header determination signal HDS and the LUN identification result IDR. The second logic circuit 222 may generate the selection signal SEL based on the header determination signal HDS and the LUN identification result IDR. The second logic circuit 222 may output the LUN identification result IDR as the selection signal SEL when the header determination signal HDS is enabled. When the header determination signal HDS is disabled, the second logic circuit 222 may fix the selection signal SEL to a specific logic level regardless of the LUN identification result IDR.

The comparison circuit 221 may include an exclusive NOR gate XNOR. The exclusive NOR gate XNOR may perform a bitwise operation. A first input terminal of the exclusive NOR gate XNOR may receive the bits CA<0:1> of the first and second bodies, and a second input terminal of the exclusive NOR gate XNOR may receive the memory die identification information LID<0:3>. The LUN identification result IDR may be outputted from an output terminal of the exclusive NOR gate XNOR. The comparison circuit 221 may enable the LUN identification result IDR to the high logic level when the logic levels of the bits CA<0:1> of the first and second bodies and the logic levels of the memory die identification information LID<0:3> coincide.

The second logic circuit 222 may include a seventh AND gate AND7. A first input terminal of the seventh AND gate AND7 may receive the header determination signal HDS, and a second input terminal of the seventh AND gate AND7 may receive the LUN identification result IDR. The selection signal SEL may be outputted from an output terminal of the seventh AND gate AND7. The second logic circuit 222 may output the selection signal SEL having the high logic level when the header determination signal HDS and the LUN identification result IDR each have the high logic level. The second logic circuit 222 may output the selection signal SEL having the low logic level when even either one of the header determination signal HDS and the LUN identification result IDR has the low logic level.

The data enable signal generation circuit 230 may include a multiplexer MUX and a flip-flop FF. The multiplexer MUX may receive the preliminary data enable signal PEN, the data enable signal ENx, and the selection signal SEL. The multiplexer MUX may output one of the preliminary data enable signal PEN and the data enable signal ENx based on the selection signal SEL. The multiplexer MUX may output the preliminary data enable signal PEN when the selection signal SEL has the first logic level, and output the data enable signal ENx when the selection signal SEL has the second logic level. An input terminal D of the flip-flop FF may receive output of the multiplexer MUX, a clock terminal CK of the flip-flop FF may receive the clock signal CK4EN, and the data enable signal ENx may be outputted from an output terminal Q of the flip-flop FF. The flip-flop FF may feedback the data enable signal ENx to the multiplexer MUX. The flip-flop FF may output the output of the multiplexer MUX as the data enable signal ENx in synchronization with an edge of the clock signal CK4EN. When the selection signal SEL has the high logic level, the data enable signal generation circuit 230 may output the preliminary data enable signal PEN as the data enable signal ENx in synchronization with the edge of the clock signal CK4EN. The data enable signal generation circuit 230 may maintain a logic level of the data enable signal ENx regardless of the preliminary data enable signal PEN when the selection signal SEL has the low logic level.

Figure 10:
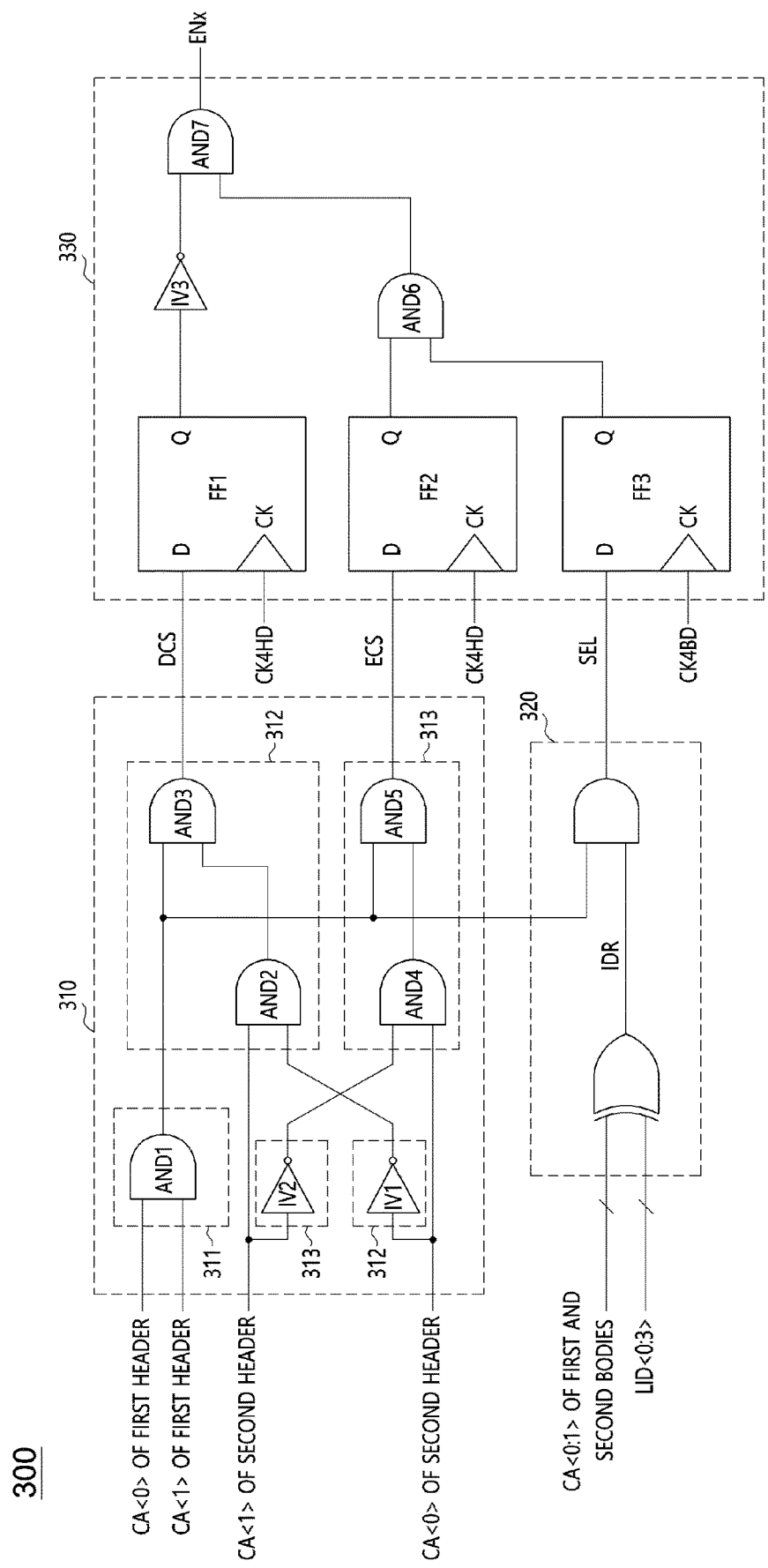
FIG. 10 is a diagram illustrating a construction of a control circuit according to an embodiment of the present technology.

FIG. 10 is a diagram illustrating a construction of a control circuit 300 according to an embodiment of the present technology. The control circuit 300 may be applied as at least a part of each of the control circuits 132 and 142 illustrated in FIG. 1, and replace the control circuit 200 illustrated in FIG. 9. The control circuit 300 may include a control signal generation circuit 310, a selection signal generation circuit 320, and a signal combination circuit 330. The control signal generation circuit 310 may receive the first and second bits CA<0> and CA<1> of the first header and the first and second bits CA<0> and CA<1> of the second header, and generate an enable control signal ECS and a disable control signal DCS based on the logic values of the bits CA<0> and CA<1> of the first header and the bits CA<0> and CA<1> of the second header. The control signal generation circuit 310 may enable the enable control signal ECS when the first and second bits CA<0> and CA<1> of the first header each have a first logic level, the first bit CA<0> of the second header has the first logic level, and the second bit CA<1> of the second header has a second logic level. The control signal generation circuit 310 may enable the disable control signal DCS when the first and second bits CA<0> and CA<1> of the first header each have the first logic level, the first bit CA<0> of the second header has the second logic level, and the second bit CA<1> of the second header has the first logic level. The selection signal generation circuit 320 may generate a selection signal SEL based on the first and second bits CA<0> and CA<1> of the first header, the bits CA<0:1> of the first and second bodies, and the memory die identification information LID<0:3>. The selection signal generation circuit 320 may be substantially the same as the selection signal generation circuit 320 illustrated in FIG. 9, and overlapping descriptions of the same components are omitted.

The signal combination circuit 330 may receive the disable control signal DCS, the enable control signal ECS, and the selection signal SEL. The signal combination circuit 330 may generate a data enable signal ENx based on the disable control signal DCS, the enable control signal ECS, and the selection signal SEL. The signal combination circuit 330 may maintain the data enable signal ENx in a disabled state when the selection signal SEL is disabled. The signal combination circuit 330 may enable the data enable signal ENx when the selection signal SEL and the enable control signal ECS are enabled, and the disable control signal DCS is disabled. The signal combination circuit 330 may disable the data enable signal ENx when the selection signal SEL and the disable control signal DCS are enabled. The signal combination circuit 330 may further receive a first clock signal CK4HD and a second clock signal CK4BD. The first and second clock signals CK4HD and CK4BD may be generated based on the command clock signal CCK illustrated in FIG. 1. For example, the first and second clock signals CK4HD and CK4BD may be generated by delaying edges of different orders of the command clock signal CCK, and the second clock signal CK4BD may have a later phase than the first clock signal CK4HD. The first clock signal CK4HD may be generated by delaying a falling edge of the command clock signal CCK in synchronization with the bits CA<0> and CA<1> of the first and second headers, and the second clock signal CK4BD may be generated by delaying the falling edge of the command clock signal CCK in synchronization with the bits CA<0:1> of the first and second bodies. The signal combination circuit 330 may sample the disable control signal DCS and the enable control signal ECS as the first clock signal CK4HD. The signal combination circuit 330 may sample the selection signal SEL as the second clock signal CK4BD. The signal combination circuit 330 may generate the data enable signal ENx based on the sampled disable control signal DCS, the sampled enable control signal ECS, and the sampled selection signal SEL.

The control signal generation circuit 310 may include a header determination circuit 311, a disable determination circuit 312, and an enable determination circuit 313. The header determination circuit 311 may receive the first and second bits CA<0> and CA<1> of the first header, and generate a header determination signal HDS. The header determination circuit 311 may enable the header determination signal HDS to the first logic level when the first and second bits CA<0> and CA<1> of the first header each have the first logic level. The header determination circuit 311 may disable the header determination signal HDS to the second logic level when even either one of the first and second bits CA<0> and CA<1> of the first header has the second logic level. The disable determination circuit 312 may generate the disable control signal DCS based on the header determination signal HDS and the logic levels of the first and second bits CA<0> and CA<1> of the second header. The disable determination circuit 312 may enable the disable control signal DCS when the header determination signal HDS is enabled, the first bit CA<0> of the second header has the low logic level, and the second bit CA<1> of the second header has the high logic level. The enable determination circuit 313 may generate the enable control signal ECS based on the header determination signal HDS and the logic levels of the first and second bits CA<0> and CA<1> of the second header. The enable determination circuit 313 may enable the enable control signal ECS when the header determination signal HDS is enabled, the first bit CA<0> of the second header has the high logic level, and the second bit CA<1> of the second header has the low logic level.

The header determination circuit 311 may include a first AND gate AND1. A first input terminal of the first AND gate AND1 may receive the first bit CA<0> of the first header, and a second input terminal of the first AND gate AND1 may receive the second bit CA<1> of the first header. The header determination signal HDS may be outputted from an output terminal of the first AND gate AND1. The header determination circuit 311 may enable the header determination signal HDS to the high logic level when the first and second bits CA<0> and CA<1> of the first header each have the high logic level.

The disable determination circuit 312 may include a first inverter IV1, a second AND gate AND2, and a third AND gate AND3. The first inverter IV1 may receive the first bit CA<0> of the second header, and invert and drive the first bit CA<0> of the second header. A first input terminal of the second AND gate AND2 may receive the second bit CA<1> of the second header, and a second input terminal of the second AND gate AND2 may receive output of the first inverter IV1. A first input terminal of the third AND gate AND3 may receive the header determination signal HDS, and a second input terminal of the third AND gate AND3 may receive output of the second AND gate AND2. The disable control signal DCS may be outputted from an output terminal of the third AND gate AND3. The disable determination circuit 312 may enable the disable control signal DCS to the high logic level when the header determination signal HDS has the high logic level, the first bit CA<0> of the second header has the low logic level, and the second bit CA<1> of the second header has the high logic level.

The enable determination circuit 313 may include a second inverter IV2, a fourth AND gate AND4, and a fifth AND gate AND5. The second inverter IV2 may receive the second bit CA<1> of the second header, and invert and drive the second bit CA<1> of the second header. A first input terminal of the fourth AND gate AND4 may receive output of the second inverter IV2, and a second input terminal of the fourth AND gate AND4 may receive the first bit CA<0> of the second header. A first input terminal of the fifth AND gate AND5 may receive the header determination signal HDS, and a second input terminal of the fifth AND gate AND5 may receive output of the fourth AND gate AND4. The enable control signal ECS may be outputted from an output terminal of the fifth AND gate AND5. The enable determination circuit 313 may enable the enable control signal ECS to the high logic level when the header determination signal HDS has the high logic level, the first bit CA<0> of the second header has the high logic level, and the second bit CA<1> of the second header has the low logic level.

The signal combination circuit 330 may include a first flip-flop FF1, a second flip-flop FF2, a third flip-flop FF3, a third inverter IV3, a sixth AND gate AND6, and a seventh AND gate AND7. An input terminal D of the first flip-flop FF1 may receive the disable control signal DCS, and a clock terminal CK of the first flip-flop FF1 may receive the first clock signal CK4HD. The first flip-flop FF1 may output the disable control signal DCS in synchronization with an edge of the first clock signal CK4HD to an output terminal Q of the first flip-flop FF1. An input terminal D of the second flip-flop FF2 may receive the enable control signal ECS, and a clock terminal CK of the second flip-flop FF2 may receive the first clock signal CK4HD. The second flip-flop FF2 may output the enable control signal ECS in synchronization with the edge of the first clock signal CK4HD to an output terminal Q of the second flip-flop FF2. An input terminal D of the third flip-flop FF3 may receive the selection signal SEL, and a clock terminal CK of the third flip-flop FF3 may receive the second clock signal CK4BD. The third flip-flop FF3 may output the selection signal SEL in synchronization with an edge of the second clock signal CK4BD to an output terminal Q of the third flip-flop FF3. The third inverter IV3 may receive output of the first flip-flop FF1, and invert and drive the output of the first flip-flop FF1. A first input terminal of the sixth AND gate AND6 may receive output of the second flip-flop FF2, and a second input terminal of the sixth AND gate AND6 may receive output of the third flip-flop FF3. A first input terminal of the seventh AND gate AND7 may receive output of the third inverter IV3, and a second input terminal of the seventh AND gate AND7 may receive output of the sixth AND gate AND6. The data enable signal ENx may be outputted from an output terminal of the seventh AND gate AND7. The signal combination circuit 330 may sample the disable control signal DCS and the enable control signal ECS in synchronization with the edge of the first clock signal CK4HD, and sample the selection signal SEL in synchronization with the edge of the second clock signal CK4BD. The signal combination circuit 330 may generate the data enable signal ENx, which is enabled to the high logic level, when the enable control signal ECS and the selection signal SEL each have the high logic level, and the disable control signal DCS has the low logic level. The signal combination circuit 330 may disable the data enable signal ENx to the low logic level when the disable control signal DCS has the high logic level.

A person skilled in the art to which the present disclosure pertains will understand that the present disclosure may be carried out in other specific forms without changing its technical spirit or essential features. Therefore, it should be understood that the embodiments described above are illustrative in all aspects, not limitative. The scope of the present disclosure is defined by the claims to be described below rather than the detailed description, and it should be construed that the meaning and scope of the claims and all changes or modified forms derived from the equivalent concept thereof are included in the scope of the present disclosure.

What is claimed is:

1. A semiconductor apparatus comprising:
   a memory cell array;
   a control circuit configured to receive a command address set, a selection chip enable command, and a selection chip disable command through a command address bus, to generate a buffer control signal based on a chip enable signal and the command address signal set, to enable a data enable signal based on the selection chip enable command, and to disable the data enable signal based on the selection chip disable command;
   a page buffer group configured to, based on the buffer control signal, generate internal data by reading data stored in the memory cell array or reset latch values of latch circuits; and
   a data input/output circuit connected to a data bus based on the data enable signal, the data input/output circuit configured to transmit data to the data bus based on the internal data or receive the data transmitted through the data bus.

2. The semiconductor apparatus according to claim 1, wherein the command address signal set comprises at least one of a data output command and a data input command.

3. The semiconductor apparatus according to claim 1, wherein the selection chip enable command and the selection chip disable command comprises selection information corresponding to identification information of the semiconductor apparatus.

4. The semiconductor apparatus according to claim 1, wherein the control circuit comprises:
   a control signal generation circuit configured to generate a preliminary data enable signal based on logic values of bits of first and second headers of the selection chip enable signal and the selection chip disable command;
   a selection signal generation circuit configured to generate a logical unit number (LUN) identification result by comparing logic values of bits of bodies of the selection chip enable signal and the selection chip disable command with identification information of the semiconductor apparatus, and to generate a selection signal based on the bits of the first header and the LUN identification result; and
   a data enable signal generation circuit configured to output the preliminary data enable signal as the data enable signal based on the selection signal.

5. The semiconductor apparatus according to claim 4, wherein the control signal generation circuit comprises:
   a header determination circuit configured to enable a header determination signal when the bits of the first header each have a first logic level;
   a disable determination circuit configured to generate a disable control signal when the header determination signal is enabled, the first bit of the second header has a second logic level, and the second bit of the second header has the first logic level;
   an enable determination circuit configured to generate an enable control signal when the header determination signal is enabled, the first bit of the second header has the first logic level, and the second bit of the second header has the second logic level; and
   a first logic circuit configured to enable the preliminary data enable signal when the enable control signal is enabled, and the disable control signal is disabled, and to disable the preliminary data enable signal when the disable control signal is enabled.

6. The semiconductor apparatus according to claim 4, wherein the selection signal generation circuit comprises:
   a comparison circuit configured to generate the LUN identification result by comparing the bits of the bodies with the identification information; and
   a second logic circuit configured to enable the selection signal when the bits of the first header each have a first logic level, and the LUN identification result has the first logic level, and to disable the selection signal when at least one of the bits of the first header has a second logic level, or the LUN identification result has the second logic level.

7. The semiconductor apparatus according to claim 4, wherein the data enable signal generation circuit:
   outputs the preliminary data enable signal as the data enable signal when the selection signal is enabled; and
   maintains a logic level of the data enable signal when the selection signal is disabled.

* * * * *